340-870.11 SR

OR 2,919,435

SEARCH ROOM

X 7004C

X 7017N

X 7002E

INVENTOR.
Jack S. Hawley
BY Flehr and Swain
ATTORNEYS

Dec. 29, 1959 J. S. HAWLEY 2,919,435

SELECTING, ROUTING AND RECEIVING SYSTEM AND APPARATUS

Filed May 6, 1955 8 Sheets-Sheet 2

INVENTOR.
Jack S. Hawley
BY Fisher & Swain
ATTORNEYS

SELECTING, ROUTING AND RECEIVING SYSTEM AND APPARATUS

Filed May 6, 1955

INVENTOR.
Jack S. Hawley
BY Fisher & Swain
ATTORNEYS

SELECTING, ROUTING AND RECEIVING SYSTEM AND APPARATUS

Filed May 6, 1955

INVENTOR.
Jack S. Hawley
BY Fisher and Swain
ATTORNEYS

Dec. 29, 1959 J. S. HAWLEY 2,919,435

SELECTING, ROUTING AND RECEIVING SYSTEM AND APPARATUS

Filed May 6, 1955 8 Sheets-Sheet 5

INVENTOR.
Jack S. Hawley
BY
ATTORNEYS

SELECTING, ROUTING AND RECEIVING SYSTEM AND APPARATUS

Filed May 6, 1955 8 Sheets-Sheet 6

INVENTOR.
Jack S. Hawley

Flehr & Swain
ATTORNEYS

SELECTING, ROUTING AND RECEIVING SYSTEM AND APPARATUS

Filed May 6, 1955 8 Sheets-Sheet 7

INVENTOR.
Jack S. Hawley

Fleher & Swain
ATTORNEYS

INVENTOR.
Jack S. Hawley
BY
Fisher & Swain
ATTORNEYS 2,919,435

SELECTING, ROUTING AND RECEIVING SYSTEM AND APPARATUS

Jack S. Hawley, Berkeley, Calif., assignor to Shand and Jurs Company, Berkeley, Calif., a corporation of California Application May 6, 1955, Serial No. 506,560

13 Claims. (Cl. 340—182)

This invention relates generally to a selecting, routing and receiving system and apparatus and more particularly to a system apparatus of this type for use in telemetering systems.

In many instances, it is desirable to provide means for selecting a particular device in metering and reading operations and causing operation of that particular device. It is also often desirable to provide means for confirming that the proper device has been selected. By way of example, a particular pulse transmitter of the type disclosed in co-pending application Serial No. 342,402 filed March 16, 1953 in the names of Ellsworth A. Hosmer, Jack S. Hawley and Albert E. Jurs, Jr. now issued into Patent Number 2,814,798 can be selected from a plurality of such transmitters situated at different locations by direct selection or by transmitting a series of pulses to remotely located selecting apparatus from a selecting and reading station. As disclosed in the above co-pending application, the pulse transmitter is adapted to be operated by a start pulse sent from the selecting and reading station after which it sends predetermined information in several series of pulses to the selecting and reading station. A series of pulses can be included in this information to actuate confirming means at the selecting and reading station to indicate whether or not the proper pulse transmitter has been selected.

The selecting and receiving means and the above described pulse transmitters may be utilized in a complete telemetering system of the type disclosed in co-pending application Serial No. 307,444 filed September 2, 1952 in the name of E. A. Hosmer for reading the liquid levels in remotely located tanks now issued into Patent No. 2,748,373.

In general, it is an object of the present invention to provide a signal transmitting, routing and receiving system and apparatus for producing one or more series of pulses for selecting a particular device.

Another object of the invention is to provide a system and apparatus of the above character for sending a start pulse.

Another object of the invention is to provide a system and apparatus of the above character for receiving and routing one or more series of pulses to actuate indicating means.

Another object of the invention is to provide apparatus of the above character for receiving and routing one or more series of pulses to actuate confirming means.

Another object of the invention is to provide a system and apparatus of the above character adapted to transmit only complete pulses.

A further object of the invention is to provide a system and apparatus of the above character in which warning means is actuated when the improper number of confirming pulses is received.

A further object of the invention is to provide a system and apparatus of the above character in which information cannot be received when such warning means is actuated.

A further object of the invention is to provide a system and apparatus of the above character in which the pulses can be adjusted.

Other objects and advantages of the invention will appear from the following description taken in conjunction with the accompanying drawings:

Referring to the drawings.

Figure 1:
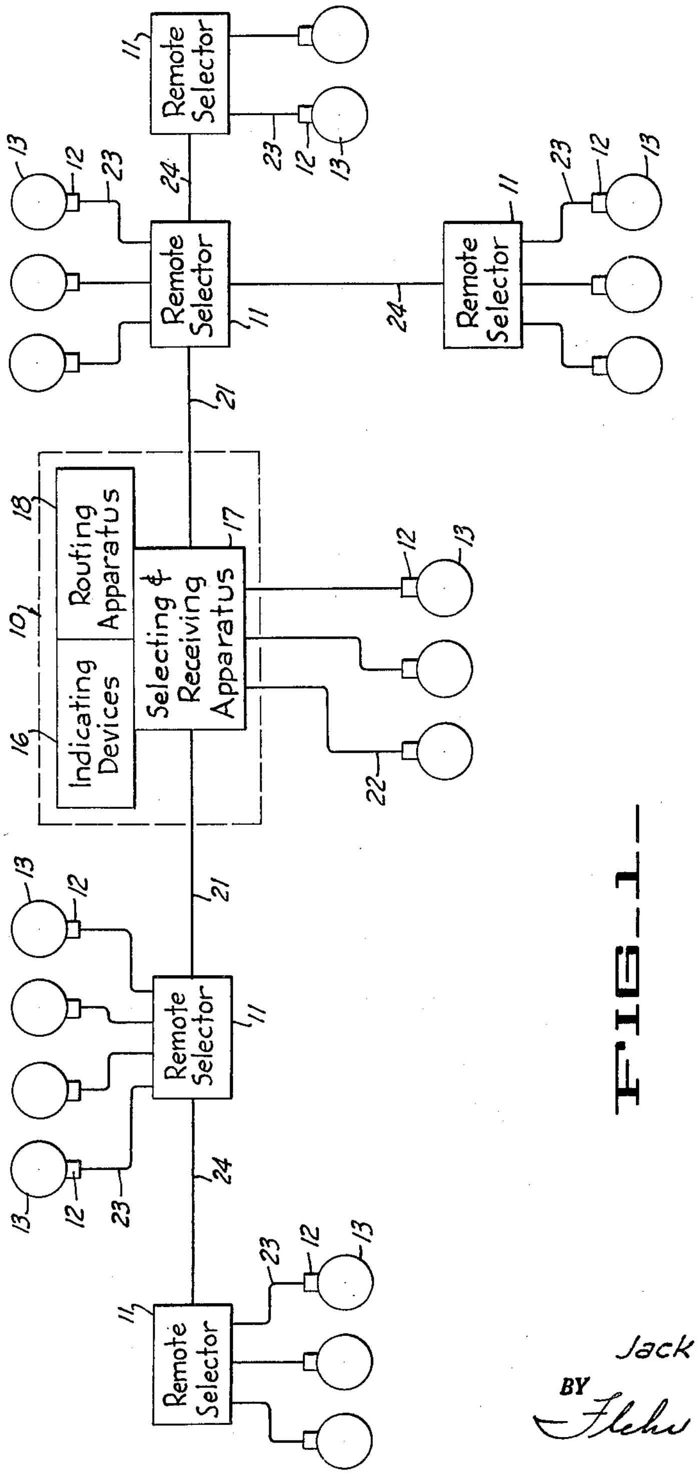
Figure 1 is a block diagram of a telemetering system incorporating a selecting, routing and receiving system and apparatus embodying the present invention.

The telemetering system illustrated in the block diagram of Figure 1 shows a typical installation and consists of a reading station 10 connected to remote selecting apparatuses 11 by conductors 21 and to local transmitters 12 at local tanks 13 by conductors 22. The remote selecting apparatuses 11 are connected to transmitters 12 at remotely located tanks 13 by conductors 23 and are also connected by conductors 24 to additional remote selecting apparatuses 11 which are connected to transmitters 12 at other remotely located tanks 13.

The transmitters 12 may be of the type disclosed in co-pending application Serial No. 342,402 filed March 16, 1953 and may be connected to different devices in the tanks so that the transmitters can relay different types of information to the reading station 10, as for example, liquid level and temperature.

The reading station 10 illustrated in the block diagram of Figure 1 consists of a plurality of indicating devices 16 which may be of any suitable type adapted to be actuated by pulses and may be graduated in terms of feet and inches to receive liquid level information. The reading station 10 also includes selecting and receiving apparatus 17 and routing apparatus 18. The selecting and receiving apparatus 17 and the routing apparatus 18 may be of the type disclosed in the present application.

Remote selecting apparatus 11 may be of the type disclosed in my co-pending application Serial No. 506,513 filed May 6, 1955 now issued into Patent No. 2,877,444.

Any suitable means may be utilized for connecting the reading station 10 to the remote selecting apparatus 11 and for connecting the remote selecting apparatus 11 to the transmitters 12, as for example, wire or radio in place of conductors 21, 22, 23 and 24.

It is apparent that transmitters 12 can be utilized at various locations where it is desired to transmit information to a remotely located reading station, as for example, dams, oil tanks, gas storage tanks, and the like.

In general, the selecting and receiving apparatus 17 and the routing apparatus 18 includes selecting means, the actuation of which causes the transmission of one or more series of selecting pulses, the number of pulses being determined by the tank station to be selected, and means for sending a start pulse to actuate the transmitter 12 after completion of transmission of selecting pulses. The selecting pulses are transmitted to the remote selecting apparatus 11 which is actuated to select the proper tank station to form a connection between the selecting and receiving apparatus 17 and the selected transmitter 12. The start pulse is then transmitted to the selected transmitter 12 which is actuated by the same to cause it to send one or more series of confirming code pulses and other predetermined information such as foot and inch pulses as disclosed in co-pending application Serial No. 342,402 filed March 16, 1953 now issued into Patent No. 2,814,798. The confirming code pulses and the other predetermined information are transmitted to routing apparatus 18 through the same connection previously established between reading station 10 and the selected transmitter 12 by remote selecting apparatus 11. Routing apparatus 18 then routes the confirming code pulses to selecting and receiving apparatus 17 which is provided with means for receiving these pulses and giving a visual, audio or other indication as to whether or not the proper tank station has been selected. Routing apparatus 18 routes the other predetermined information transmitted by the selected transmitter 12 to indicating devices 16 which may give a visual or other indication of the received information. Means is provided for "homing" the complete system and apparatus at the end of the reading operation after which it is in readiness for another tank selection and reading operation.

Figure 2:
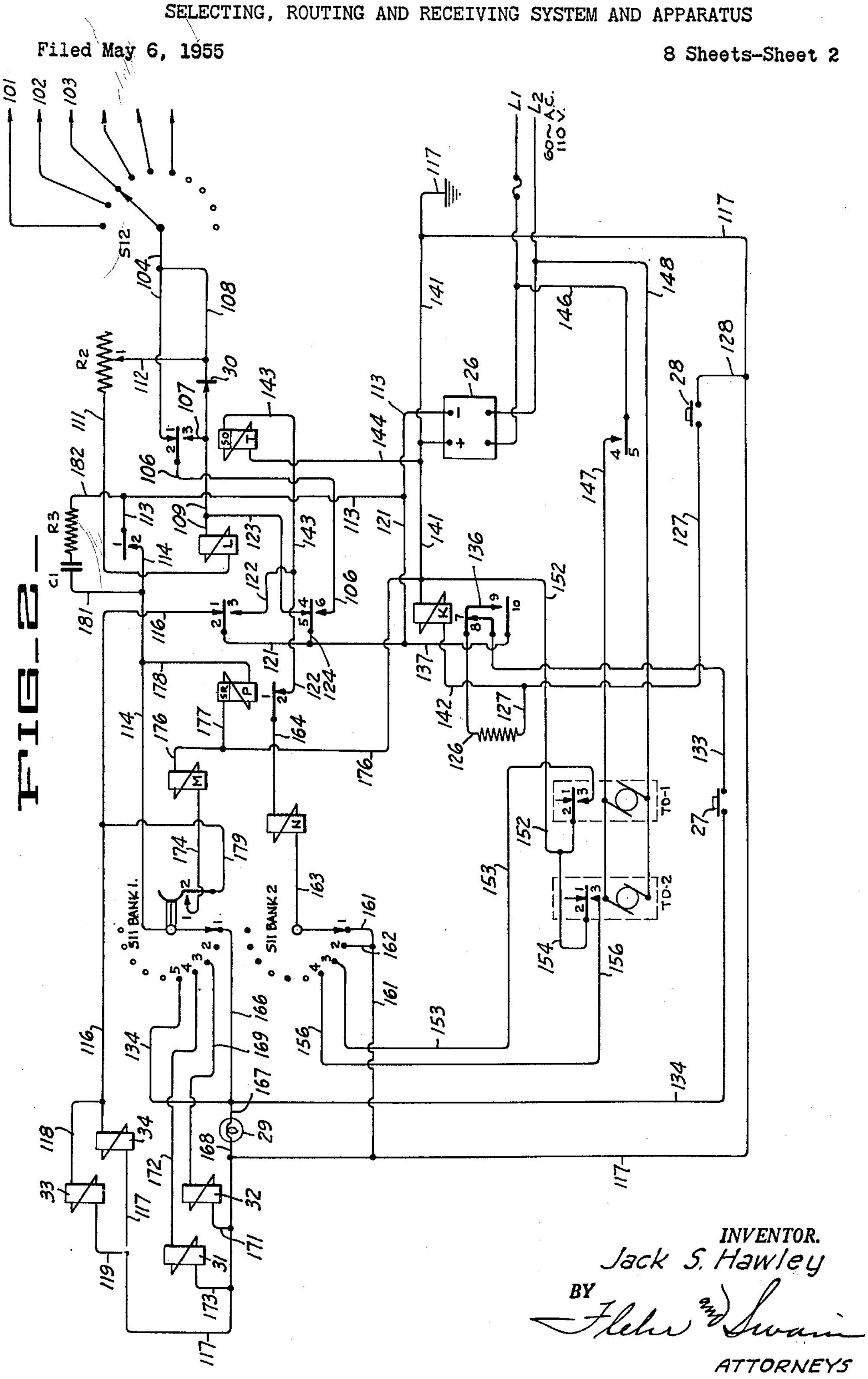
Figure 2 is a circuit diagram of one embodiment of my invention illustrating direct selecting means together with means for receiving and routing a predetermined series of indicating pulses.

As shown schematically in Figure 2, the routing apparatus 18 is connected to direct selecting means and consists of a plurality of relays, relays K, L, P and T, a two bank direct driven stepping switch S11 with a reset coil M and a step coil N, and two time delay devices, TD–1 and TD–2. Relay K is provided with a plurality of contacts 1 through 10. Relay L is provided with contacts 1 and 2, relay P is provided with normally closed contacts 1 and 2 and relay T is provided with contacts 1 through 5. The stepping switch S11 is provided with two banks, bank 1 and bank 2 and with off-normal contacts 1 and 2. Each bank has ten terminals 1 through 10 and a wiping contact. Bank 1 is of the non-bridging type, i.e., the wiper arm leaves one contact before it touches another, whereas bank 2 is of the bridging type, i.e., the wiping arm engages the next succeeding contact before it disengages the preceding contact.

The time delay devices are of the conventional motor operated type and are provided with means for automatic resetting upon de-energization. Time delay device TD–1 is provided with contacts 1, 2 and 3, and TD–2 is also provided with contacts 1, 2 and 3.

Lines L1 and L2 are connected to a conventional 110 volt 60 cycle alternating current supply and are connected to the 48 volt direct current power supply 26.

The routing apparatus also consists of resistors R1, R2, and R3, a condenser C1, a start button 27, a reset button 28, a ready lamp 29, and a rectifier 30.

The routing apparatus is shown schematically connected to indicator step coils 31 and 32 and to indicator reset coils 33 and 34 which are associated with indicating devices 16.

The routing apparatus is connected to a simple rotary selector switch S12, however other suitable means may be used such as a plurality of key switches.

The above mentioned components of the routing apparatus of Figure 2 are connected together in the following manner. The contacts of selector switch S12 are directly connected to the transmitters 12 by conductors 101, 102 and 103, etc. The transmitters can be of the type described in co-pending application Serial No. 342,402 filed March 16, 1953 in the names of Ellsworth A. Hosmer, Jack S. Hawley and Albert E. Jurs, Jr., now issued into Patent No. 2,814,798.

The wiping contact of selector switch S12 is connected to stationary contact 1 of relay T by conductor 104. Movable contact 2 of relay T is connected to the stationary contact 6 of relay K by conductor 106. The stationary contact 3 of relay T is connected to one side of the rectifier 30 by conductor 107 and the other side of the rectifier 30 is connected to conductor 104 by conductor 108. Conductor 107 is connected to one side of the winding of relay 1 by conductor 109 and the other side of the winding of relay L is connected to resistor R2 by conductor 111. The resistor R2 is provided with an adjustable tap 1 which is connected to conductor 108 by conductor 112.

Movable contact 1 of relay L is connected to the negative terminal of the D.C. power supply 26 by conductor 113 and the stationary contact 2 of relay L is connected to the wiping contact of bank 1 of switch S11 by conductor 114.

Stationary contact 1 of relay K is connected to one side of the indicator reset coil 34 by conductor 116. The other side of the indicator reset coil 34 is connected to ground by conductor 117. One side of the indicator reset coil 33 is connected to conductor 116 by conductor 118 and the other side of the indicator reset coil 33 is connected to conductor 117 by conductor 119.

Movable contact 2 of relay K is connected to conductor 113 by conductor 121. Stationary contact 3 of relay K is connected to stationary contact 2 of relay P by conductor 122. Stationary contact 4 of relay K is connected to conductor 109 by conductor 123, and movable contact 5 of relay K is connected to conductor 121 by conductor 124. Movable contact 7 of relay K is connected to one end of resistor R1 by conductor 126 and the other end of resistor R1 is connected to one side of the reset button 28 by conductor 127. The other side of the reset button is connected to conductor 117 by conductor 128.

Stationary contact 8 of relay K is connected to one side of the start button 27 by conductor 133 and the other side of the start button 27 is connected to terminal 5 of bank 1 of switch S11 by conductor 134. Stationary contact 9 of relay K is connected to contact 7 of relay K by conductor 136. Movable contact 10 of relay K is connected to conductor 121 by conductor 137.

The winding of relay K has one side connected to the positive terminal of the D.C. power supply 26 by conductor 141 and the other side of the winding is connected to conductor 127 by conductor 142.

One side of the winding of relay T is connected to the conductor 122 by conductor 143 and the other side of the winding is connected to conductor 141 by conductor 144. Movable contact 5 of relay T is connected to a line L1 by conductor 146 and stationary contact 4 of relay T is connected to one side of the motors of the time delay devices TD–1 and TD–2 by conductor 147. The other side of the motors are connected to line L2 by conductor 148.

Movable contact 2 of time delay device TD–1 is connected to conductor 141 by conductor 152. Stationary contact 3 of TD–1 is connected to terminal 3 of bank 2 of switch S11 by conductor 153.

Movable contact 2 of TD–2 is connected to conductor 152 by conductor 154. Stationary contact 3 of TD–2 is connected to terminal 4 of bank 2 of switch S11 by conductor 156.

Terminal 1 of bank 2 of switch S1 is connected to conductor 117 by conductor 161 and terminal 2 of bank 2 of switch S11 is connected to conductor 161 by conductor 162. The wiping contact of bank 2 of switch S11 is connected to one side of step coil N by conductor 163 and the other side of step coil N is connected to movable contact 1 of relay P by conductor 164.

Terminal 1 of bank 1 of switch S11 is connected to conductor 134 by conductor 166. The lamp 29 has one side connected to conductor 134 by conductor 167, and the other side connected to conductor 117 by conductor 168. Terminal 3 of bank 1 of switch S11 is connected to one side of the indicator step coil 32 by conductor 169 and the other side of step coil 32 is connected to conductor 117 by conductor 171. Terminal 4 of bank 1 of switch S11 is connected to one side of the indicator step coil 31 by conductor 172 and the other side of step coil 31 is connected to the conductor 117 by conductor 173. The off-normal contact 1 of switch S11 is connected to one side of the reset coil M by conductor 174 and the other side of the reset coil M is connected to conductor 141 by conductor 176. One side of the coil of relay P is connected to conductor 176 by conductor 177, and the other side of the coil of relay P is connected to conductor 114 by conductor 178. Off-normal contact 2 is connected to conductor 116 by conductor 179.

One side of condenser C1 is connected to conductor 114 by conductor 181 and the other side of condenser C1 is connected to one end of resistance R3. The other end of resistance R3 is connected to conductor 113 by conductor 182.

Condenser C1 and resistance R3 are provided to prolong the life of contacts 1 and 2 of relay L in a manner well known to those skilled in the art.

Operation of the embodiment of my invention shown in Figure 2 may now be briefly described as follows: Let it be assumed that conductors 101, 102 and 103 are directly connected to transmitters 12 and that it is desired to obtain a reading from the transmitter 12 connected to conductor 101.

Rotation of the wiping contact of switch S12 to the contact connected to conductor 101 causes operation of relay L. This circuit is completed from the negative terminal of the D.C. power supply 26 through conductor 113, conductor 121, conductor 124, contacts 4 and 5 of relay K, conductor 123, conductor 109, the winding of relay L, conductor 111, resistance R2, adjustable tap 1 of resistance R2, conductor 112, conductor 108, conductor 104, wiping contact of switch S12, conductor 101 to the transmitter where conductor 101 is grounded.

Operation of relay L causes ready light 29 to glow if the system is operating properly. This circuit is completed from the negative terminal of the D.C. power supply 26, through conductor 113, contacts 1 and 2 of relay L, conductor 114, the wiping contact of bank 1 of switch S11, terminal 1 of bank 1 of switch S11, conductor 166, conductor 167, lamp 29, conductor 168, conductor 117 to ground.

Operation of relay L also causes operation of relay P. This circuit is completed from the negative terminal of the power supply through conductor 113, contacts 1 and 2 of relay L, conductor 114, conductor 178, coil of relay P, conductor 177, conductor 176, conductor 141, conductor 117 to ground.

As soon as the ready light glows, the start button 27 may be pressed. Operation of the start button causes operation of relay K. This circuit is completed from the negative terminal of the D.C. power supply 26, through conductor 113, terminals 1 and 2 of relay L, conductor 114, the wiping contact of bank 1 of switch S11, terminal 1 of bank 1 of switch S11, conductor 166, conductor 134, start button 27, conductor 133, contacts 7 and 8 of relay K, conductor 126, resistor R1, conductor 127, conductor 142, the winding of relay K, conductor 141 to the positive terminal of the D.C. power supply 26 which is grounded.

Operation of relay K opens its contacts 7 and 8 and closes its contacts 9 and 10. Opening of the contacts 7 and 8 removes the D.C. voltage from start button 27 allowing its release, and contacts 9 and 10 establish a holding circuit for relay K.

The holding circuit is completed from the negative terminal of the D.C. power supply, through conductor 113, conductor 121, conductor 137, contacts 9 and 10 of relay K, conductor 136, conductor 126, resistance R1, conductor 127, conductor 142, the winding of relay K, conductor 141 to the positive terminal of the D.C. power supply which is grounded.

Operation of relay K also closes its contacts 5 and 6 and commences the transmission of the start pulse onto conductor 101 to the transmitter. This circuit is completed from the negative terminal of the D.C. power supply, through conductor 113, conductor 121, conductor 124, contacts 5 and 6 of relay K, conductor 106, contacts 1 and 2 of relay T, conductor 104, the wiping contact of switch S12, contact 1 of switch S12, conductor 101 to the transmitter 12 where conductor 101 is grounded.

Operation of relay K also opens its contacts 4 and 5 causing de-energization of relay L. Contacts 2 and 3 of relay K are closed and serve to energize relay T. This circuit is completed from the negative terminal of the D.C. power supply, through conductor 113, conductor 121, contacts 2 and 3 of relay K, conductor 122, conductor 143, the coil of relay T, conductor 144, conductor 141 to the positive terminal of the D.C. power supply. Thus energization of relay K causes energization of relay T. However, relay T is of the "slow to operate" type and hence will not operate until a predetermined interval after relay K has been operated, the predetermined interval determining the duration of the start pulse.

Although relay L follows the pulses received on conductor 101, relay P will not follow the pulses because it is of the slow to release type. Thus relay P will be operated on the first pulse and will remain operated during the time the pulses are being transmitted by the transmitter 12. Relay P will release in a predetermined interval of time after receipt of the last pulse. Energization of relay T terminates the transmission of the start pulse by opening contacts 1 and 2 of relay T.

Operation of relay T also closes its contacts 4 and 5 which serve to place 110 volts on the motors of the time delay devices TD–1 and TD–2 and serve to start them operating.

Energization of relay L causes energization of relay P. This circuit is completed from the negative terminal of the D.C. power supply, through conductor 113, terminals 1 and 2 of relay L, conductor 114, conductor 178, the coil of relay P, conductor 177, conductor 117 to ground.

De-energization of relay L by removal of the ground on conductor 101 during the start pulse causes de-energization of relay P by opening contacts 1 and 2 of relay L. Release of relay P closes its contacts 1 and 2 which cause energization of step coil N which causes the wiping contacts of switch S11 to advance from terminals 1 to terminals 2 of the respective banks. The circuit is completed from the negative terminal of the D.C. power supply, through conductor 113, conductor 121, contacts 2 and 3 of relay K, conductor 122, contacts 1 and 2 of relay P, conductor 164, step coil N, conductor 163, the wiping contact of bank 2 of switch S11, conductor 161, conductor 117 to ground.

The bridging characteristics of bank 2 serve to maintain energization of the step coil N until the wiping contacts have been advanced from terminals 1 to terminals 2.

Energization of relay T also closes its contacts 2 and 3 which prepares the energizing circuit of relay L to respond to the periodic grounding of line 101 by transmitter 12. This circuit is completed from the negative terminal of the D.C. power supply through conductor 113, conductor 121, conductor 124, contacts 5 and 6 of relay K, conductor 106, contacts 2 and 3 of relay T, conductor 107, conductor 109, coil of relay L, conductor 111, resistor R2, adjustable tap 1, conductor 112, conductor 104, the wiping contact of switch S12, conductor 101 to ground at transmitter 12.

The routing apparatus of Figure 2 is now in condition to receive confirming pulses from the transmitter. The trtansmitter 12 after reception of the start pulse serves to periodically connect conductor 101 to ground which in turn causes the transmission of a series of pulses to periodically operate relay L because of the D.C. voltage supplied by contacts 2 and 3 of relay T through the winding of relay L to conductor 104 in the circuit previously described.

The rectifier 30 is placed in parallel with the coil of relay L and resistor R2 to produce a delay in the drop out time. The tapped resistor R2 makes it possible to lower the current supplied to the winding of relay L thus taking it longer to pull in and quicker to drop out. The rectifier 30 serves to delay the drop out time because it will not pass the signal current but only the collapse current to thus delay collapse of the field and thus delaying the drop out of relay L to cause the same effect as a longer pulse. By adjusting the position of tap 1 of resistor R2, compensation can be made for distorted pulses arriving on conductor 104.

The first operation of relay L by a pulse from the transmitter 12 causes energization of relay P through closure of the contacts 1 and 2 of relay L hereinbefore described. Relay L follows the pulses and is de-energized between pulses, but relay P does not follow the pulses and remains energized as long as pulses are being received from the transmitter because relay P is of the "slow to release" type.

Confirming code pulses are received from the transmitter on terminal 2 of bank 1 of switch S11 but in this instance code pulses are not needed for confirming purposes because the transmitters are directly selected by the selector switch S12. Relay L follows the code pulses and periodically opens and closes its contacts 1 and 2 to periodically place a negative voltage on terminal 2 of bank 1 of switch S11. This circuit can be traced from the negative terminal of the D.C. power supply, through conductor 113, contacts 1 and 2 of relay L, conductor 114, the wiping contact of bank 1 of switch S11 to terminal 2 of bank 1.

After the code pulses have been received, a predetermined time interval elapses before additional information is sent. During this time interval relay L remains de-energized for sufficient time to allow release of relay P. Contacts 1 and 2 of relay P will then be closed to energize step coil N through the circuit previously described, except in this instance, it will be through terminal 2 of bank 2 of switch S11. Thus the wiping contacts of stepping switch S11 will be advanced to terminals 3 of banks 1 and 2.

The routing apparatus is now in condition to receive additional information from the transmitter. For instance, the transmitter may now transmit a series of pulses indicating feet. Relay L will again follow the pulses which will cause its contacts 1 and 2 to be periodically closed to periodically place a negative voltage on terminal 3 of bank 1 to in turn periodically energize indicator step coil 32. This circuit is completed from the negative terminal of the D.C. power supply, through conductor 113, terminals 1 and 2 of relay L, conductor 114, the wiping contact of bank 1, terminal 3 of bank 1, conductor 169, indicator step coil 32, conductor 171, conductor 117 to ground.

During the time these foot pulses are being received, relay P remains energized. However, after completion of the transmission of the foot pulses, a predetermined time interval elapses and again relay P will be released to close its contacts 1 and 2 to energize the step coil N to advance the wiping contacts of switch S11 from terminals 3 to terminals 4. However, it will be noted that before the step coil N can be energized, the time delay device TD–1 must have operated to close its contacts 2 and 3 before a circuit will be completed to ground. This circuit is completed from the negative terminal of the D.C. power supply through the step coil N in the normal manner to terminal 3 of bank 2, through conductor 153, contacts 2 and 3 of TD–1, conductor 152, conductor 141 to the positive terminal of the D.C. power supply.

The time delay device TD–1 is provided to take care of the contingency when no foot pulses are transmitted from the transmitter, for instance, when there is a zero foot reading to be made. Assuming that no foot pulses are transmitted after receipt of the code pulses, relay L and relay P would remain deenergized and the contacts 1 and 2 of relay P would remain closed. Step coil N then cannot be energized because terminal 3 of bank 2 is not connected to ground until TD–1 operates to close contacts 2 and 3. Hence, TD–1 is set to operate during the time in which the foot pulses normally should have been received. Operation of TD–1 closes its contacts 2 and 3 and places a ground on terminal 3 of bank 2 to cause energization of the step coil N to advance the wiping contacts of switch S1 from terminals 3 to terminals 4.

After a predetermined interval of time after transmission of the foot pulses, the transmitter 12 sends additional predetermined information over the conductor 101 which in this instance may consist of inch information. Relay L again follows these pulses to cause a series of pulses to be placed on terminal 4 of bank 1 to periodically energize the indicator step coil 31 in a circuit similar to that described for energization of indicator step coil 32.

After completion of the reception of the inch pulses, a predetermined time interval elapses and relay P will again be released. Contacts 1 and 2 of relay P are closed energizing step coil N to advance the wiping contacts of switch S1 from terminals 4 to terminals 5. However, again in this instance, the step coil N will not be energized until the time delay device TD–2 has operated to close its contacts 2 and 3. This circuit is completed from the negative terminal of the D.C. power supply through the wiping contact of bank 2 in a normal manner through terminal 4 of bank 2, through conductor 156, contacts 2 and 3 of TD–2, conductor 154, conductor 152, conductor 141 to the positive terminal of the D.C. power supply.

The time delay device TD–2 is provided for the contingency when no inch pulses are received from the transmitter. Under such circumstances, the L and P relays will remain deenergized and contacts 1 and 2 of the P relay will remain closed. Thus, terminal 4 of bank 2 is not grounded until contacts 2 and 3 of TD–2 have been closed. TD–2 is made to operate during the interval in which the inch pulses normally are received. Thus, if no inch pulses are received, the wiper contact will still be advanced from terminal 4 to terminal 5.

When the wiping contact of switch S1, bank 1 advances to terminal 5, the circuit for ready light 29 is prepared to respond to operation of relay L. Thus, when the transmitter 12 has completed its cycle, conductor 101 will again be grounded to cause relay L to operate which in turn energizes ready light 29. This circuit is completed from the negative terminal of the D.C. power supply through conductor 113, contacts 1 and 2 of relay L, conductor 114, the wiping contact of bank 1 of switch S1, terminal 5 of switch S11, conductor 134, conductor 167, ready light 29, conductor 163, conductor 117 to ground.

The reading operation has now been completed and the routing apparatus may be reset so that another reading operation may be undertaken. To reset the routing apparatus, the reset button 28 is operated which de-energizes relay K by shunting the coil of relay K. Resistance R1 serves to prevent a direct short on the D.C. power supply when the reset button is operated.

De-energization of relay K closes its contacts 1 and 2 which serve to energize the reset coil M and the indicator reset coils 33 and 34. The circuit is completed from the negative terminal of the D.C. power supply through conductor 113, conductor 121, contacts 1 and 2 of relay K, conductor 116, conductor 179, off-normal contacts 1 and 2 of switch S1, conductor 174, reset coil M, conductor 176, conductor 141, conductor 117 to ground.

It is apparent that at the same time the reset coil M is energized, that ready lamp 29 will be shifted from terminal 5 to terminal 1 of switch S1 and then remain lit. The circuit for energizing the indicator reset coils 33 and 34 is from the negative terminal of the D.C. power supply, through conductor 113, conductor 121, contacts 1 and 2 of relay K, conductor 116, from which the circuit splits and goes in parallel through the coils 33 and 34 to conductor 117 to ground.

The energization of reset coil M serves to return the wiping contacts of switch S11 to their home position on terminals 1. As soon as they have reached home, the off-normal contacts 1 and 2 of switch S1 are opened serving to de-energize the reset coil M. The indicator reset coils are also provided with means (not shown) for de-energizing the same when the indicators have been returned to their home positions.

The de-energization of relay K also serves to de-energize relay T to open contacts 4 and 5 of relay T to de-energize time delay devices TD–1 and TD–2. As previously explained, TD–1 and TD–2 are provided with means for automatic resetting upon deenergization of the same.

De-energization of relay K returns the energizing circuit for relay L to the initial condition hereinbefore described.

Thus it is apparent that the routing apparatus as shown in Figure 2 is ready to perform another reading operation, such as reading the transmitter attached to conductor 102.

Figure 3:
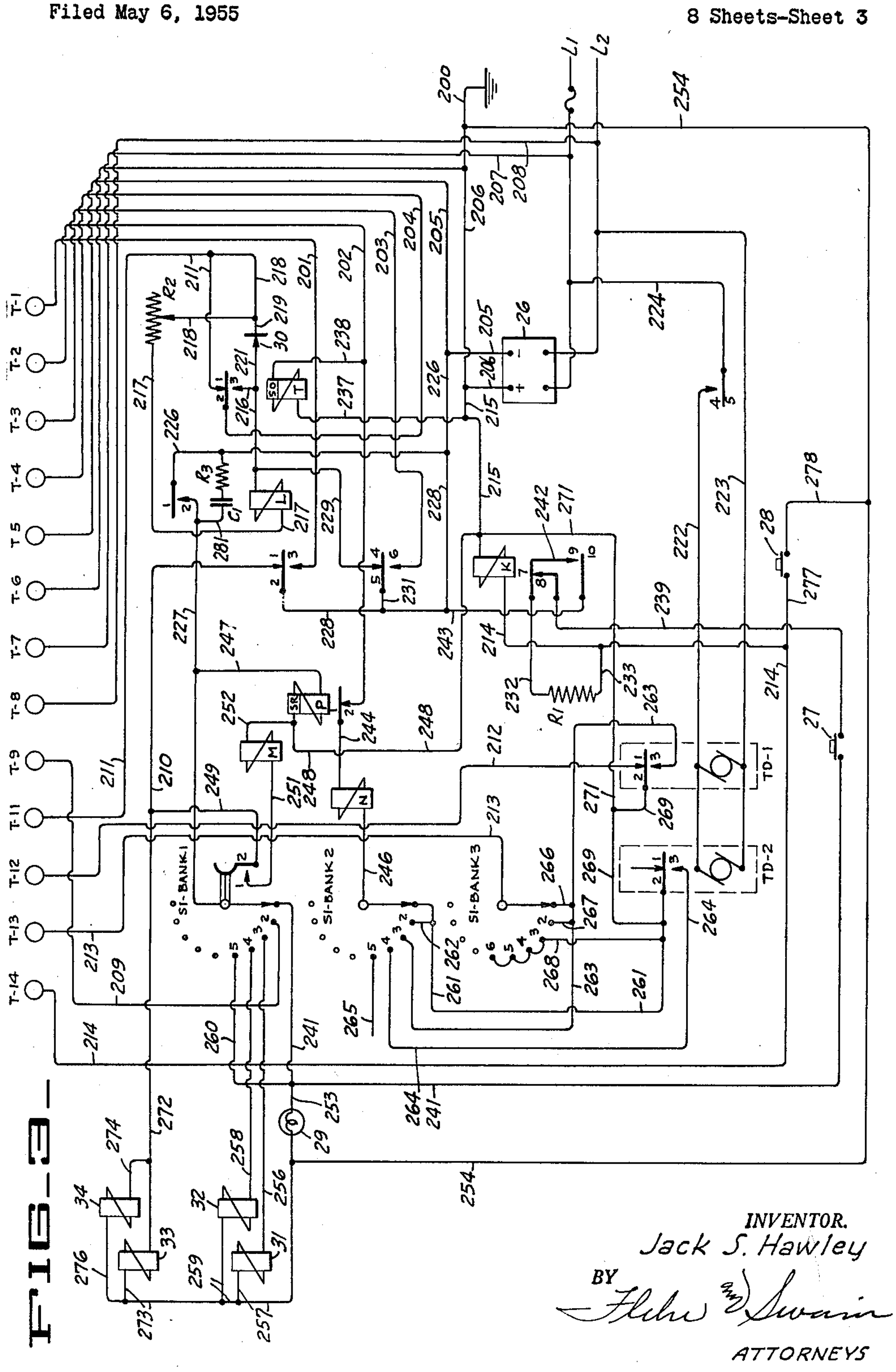
Figure 3 is a circuit diagram of a portion of another embodiment of my invention illustrating routing apparatus which may be connected for remote or remote and local selection with provision for receiving a single series of confirming code pulses.

As shown schematically in the circuit diagram of Figure 3, a routing system apparatus connected for remote or remote and local selection consists of a plurality of relays, relays K, L, P and T, a three bank stepping switch S1 with a reset coil M and a step coil N, and two time delay devices, TD–1 and TD–2. Relay K is provided with a plurality of contacts, contacts 1 through 10, relay L is provided with contacts 1 and 2, relay P is provided with normally closed contacts 1 and 2 and relay T is provided with contacts 1 through 5. The three bank stepping switch S1 is of the direct driven "minor" switch type which steps immediately upon energization of the step coil. Each of the banks of switch S1 is provided with a wiping contact and a series of ten terminals, numbered 1 through 10. The time delay device TD–1 is provided with contacts 1, 2 and 3, and the time delay device TD–2 is also provided with contacts 1, 2 and 3.

The apparatus also consists of a condenser C1, resistances R1, R2 and R3 and a plurality of terminals T1 through T14. A 48 volt D.C. power supply 26 or of any suitable voltage is connected to lines L1 and L2 which are connected to a suitable source of voltage such as 110 volts 60 cycle alternating current. The apparatus also includes a start button 27, a reset button 28, a ready lamp 29 and a rectifier 30. Indicator step coils 31 and 32 and indicator reset coils 33 and 34 are parts of conventional indicating devices and are shown to facilitate explanation of the operation of the apparatus.

The above components in Figure 3 are connected together in the following manner. In the first place, it should be stated that terminals T1 through T14 of Figure 3 are connected to corresponding terminals in Figure 4 hereinafter described. In Figure 3, terminal T1 is connected to stationary contact 3 of relay K by conductor 201. Terminal T2 is connected to stationary contact 2 of relay P by conductor 202 and terminal T3 is connected to stationary contact 6 of relay K by conductor 203. Terminal T4 is connected to movable contact 2 of relay T by conductor 204 and terminal T5 is connected to the negative terminal of the D.C. power supply 26 by conductor 205. Terminal T6 is connected to the positive terminal of the D.C. power supply by conductor 206 and is also connected to ground by conductor 200. Terminal T7 is connected to line L1 by conductor 207 and terminal T8 is connected to line L2 by conductor 208. Terminal T9 is connected to terminal 2 of bank 1 of switch S1 by conductor 209 and terminal T11 is connected to stationary contact 1 of relay T by conductor 211. Terminal T12 is connected to stationary contact 1 of time delay device TD–2 by conductor 212. Terminal T13 is connected to the wiping contact of bank 3 of switch S1 by conductor 213. Terminal T14 is connected to one side of the winding of relay K by conductor 214 and the other side of the winding of relay K is connected to conductor 206 by conductor 215.

Stationary contact 3 of relay T is connected to one side of the winding of relay L by conductor 216 and the other side of the winding of relay L is connected to one end of resistance R2 by conductor 217. Resistance R2 is provided with an adjustable tap 1 which is connected to conductor 211 by conductor 218. Conductor 218 is connected to one side of rectifier 30 by conductor 219 and the other side of the rectifier 30 is connected to conductor 216 by conductor 221.

Stationary contact 4 of relay T is connected to one side of the motors of the time delay devices TD–1 and TD–2 by conductor 222 and the other sides of the motors are connected to line L2 by conductor 223. Movable contact 5 of relay T5 is connected to line L1 by conductor 224.

Movable contact 1 of relay L is connected to conductor 205 by conductor 226 and stationary contact 2 of relay L is connected to the wiping contact of bank 1 of switch S1 by conductor 227.

Movable contact 2 of relay K is connected to conductor 226 by conductor 228 and stationary contact 4 of relay K is connected to conductor 216 by conductor 229. Movable contact 5 of relay K is connected to conductor 228 by conductor 231. Movable contact 7 of relay K is connected to one side of the resistance R1 by conductor 232 and the other side of the resistance R1 is connected to conductor 214 by conductor 233. One side of the winding of relay T is connected to conductor 215 by conductor 237 and the other side of the winding of relay T is connected to conductor 202 by conductor 238.

Stationary contact 8 of relay K is connected to one side of the start button 27 by conductor 239 and the other side of the start button 27 is connected to terminal 1 of bank 1 of switch S1 by conductor 241. Stationary contact 9 of relay K is connected to conductor 232 by conductor 242 and movable contact 10 of relay K is connected to conductor 228 by conductor 243.

Movable contact 1 of relay P is connected to one side of step coil N by conductor 244 and the other side of step coil N is connected to the wiping contact of bank 2 of switch S1 by conductor 246. One side of the winding of relay P is connected to conductor 227 by conductor 247 and the other side of the winding of relay P is connected to conductor 215 by conductor 248. Off-normal contact 2 is connected to conductor 210 by conductor 249, Off-normal contact 1 of switch S1 is connected to one side of the reset coil M by conductor 251 and the other side of the reset coil M is connected to conductor 248 by conductor 252.

One side of the lamp 29 is connected to conductor 241 by conductor 253 and the other side of the lamp 29 is connected to conductor 200 and ground by conductor 254. Terminal 3 of bank 1 is connected to one side of the indicator step coil 31 by conductor 256 and the other side of the step coil 31 is connected to conductor 254 by conductor 257. Terminal 4 of bank 1 is connected to the indicator step coil 32 by conductor 258 and the other side of the step coil 32 is connected to conductor 257 by conductor 259. Terminal 5 of bank 1 is connected to conductor 241 by conductor 260. The remainder of the terminals of bank 1 are not used in this embodiment of my invention.

Terminal 1 of bank 2 is connected to movable contact 2 of the time delay device TD–2 by conductor 261. Terminal 2 of bank 2 is connected to conductor 261 by conductor 262 and terminal 3 of bank 2 is connected to stationary contact 3 of TD–1 by conductor 263. Terminal 4 of bank 2 is connected to stationary contact 3 of TD–2 by conductor 264. Terminal 5 of bank 2 is connected to conductor 264 by conductor 265.

Terminal 1 of bank 3 is connected to conductor 263 by conductor 266 and terminal 2 of bank 3 is connected to conductor 263 by conductor 267. Terminals 3, 4, 5 and 6 of bank 3 are interconnected and are connected to conductor 261 by conductor 268.

Movable contact 2 of TD–1 is connected to conductor 261 by conductor 269 and conductor 269 is connected to conductor 215 by conductor 271.

One side of indicator reset coil 33 is connected to conductor 210 by conductor 272 and the other side of reset coil 33 is connected to conductor 259 by conductor 273. One side of indicator reset coil 34 is connected to conductor 272 by conductor 274 and the other side of reset coil 34 is connected to conductor 273 by conductor 276.

The reset button 28 has one side connected to conductor 214 by conductor 277 and the other side of conductor 254 by conductor 278.

One side of condenser C1 is connected to conductor 227 by conductor 281 and the other side of condenser C1 is connected to one end of resistor R3 which has its other end connected to conductor 226. Condenser C1 and resistor R3 perform the same purpose as in Figure 2.

The operation of the routing apparatus as shown in Figure 3 will be described in conjunction with the description of the operation of the selecting and receiving apparatus shown in Figure 4 hereinafter described.

Figure 4:
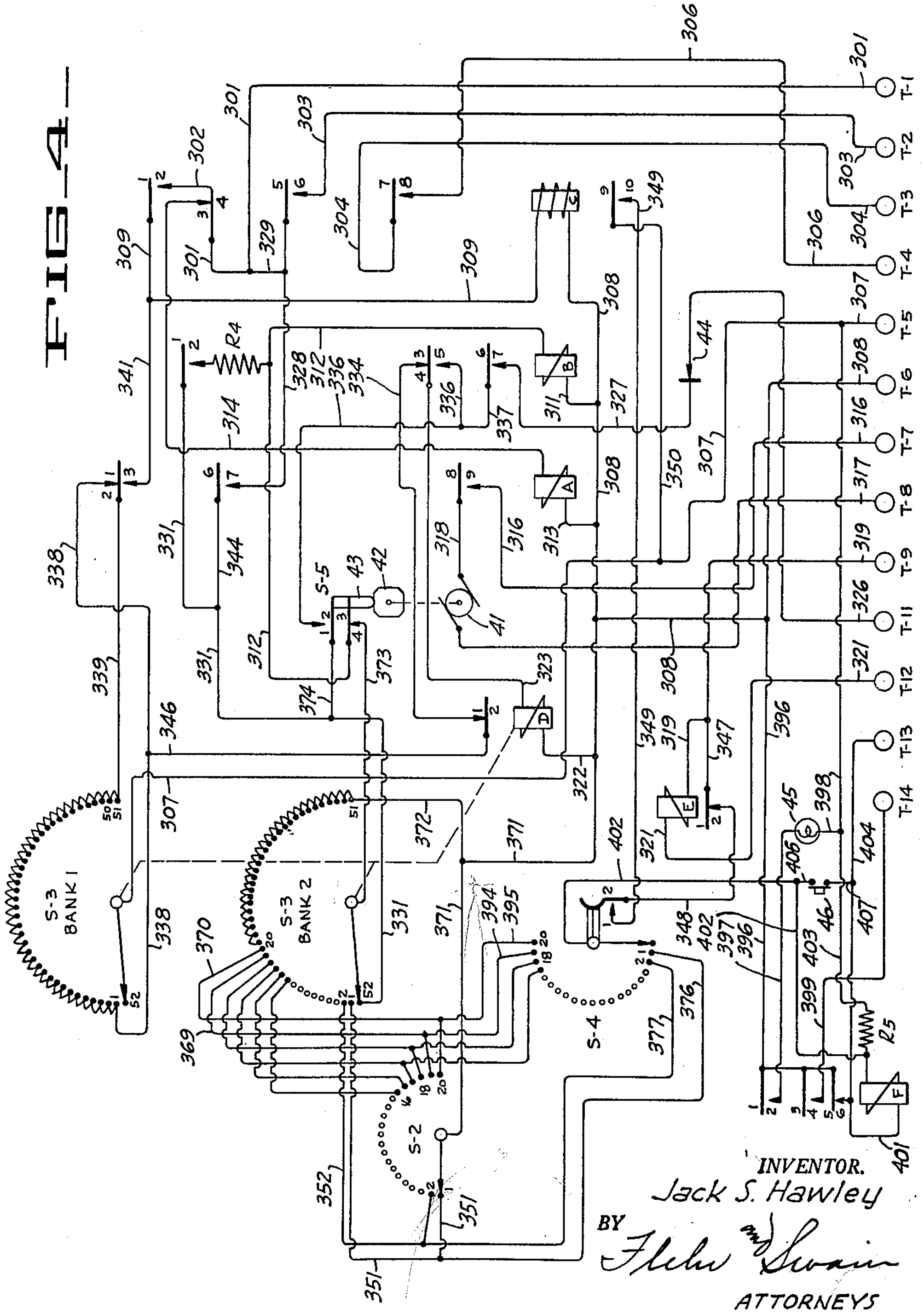
Figure 4 is a circuit diagram of a portion of one embodiment of my invention illustrating a selecting and receiving system and apparatus of the type adapted to cooperate with the routing apparatus of Figure 3 for remote selection only and which is adapted to transmit a single series of selecting pulses and to receive a single series of confirming code pulses.

As shown schematically in Figure 4, the signal transmitting and receiving apparatus consists of a plurality of relays, relays A, B, C and F and switches S2, S3 with step coil D, S4 with step coil E, and impulse switch S5. Relay A is provided with a plurality of contacts, contacts 1, 2, 3 and 6 through 9. Relay B is also provided with contacts 1 through 7. Relay C is provided with contacts 1 through 10. Step coil D is provided with normally closed contacts 1 and 2 and step coil E is provided with normally closed contacts 1 and 2. Relay F is provided with contacts 1 through 6.

The apparatus shown in Figure 4 also includes a plurality of terminals T1 through T14 which are to be connected to the corresponding terminals T1 to T14 of Figure 3.

Also included in the apparatus are resistors R4 and R5, a motor 41, and a cam 42 connected to the motor 41. The cam 42 serves to operate the impulse switch S5 comprised of contacts 1 through 4 by means of an insulating block 43 which frictionally engages the cam 42. A rectifier 44, a warning lamp 45 and a reset button 46 are also included within the apparatus.

Switch S2 is provided with twenty terminals whereas banks 1 and 2 of switch S3 are each provided with fifty-two terminals. Switch S4 is provided with twenty terminals.

The above components of the selecting and receiving apparatus of Figure 4 are connected together in the following manner. Terminal T1 is connected to contact 4 of relay C by conductor 301. Stationary contact 2 of relay C is connected to movable contact 4 of relay C by conductor 302. Terminal T2 is connected to stationary contact 6 of relay C by conductor 303 and terminal T3 is connected to movable contact 7 of relay C by conductor 304. Terminal T4 is connected to stationary contact 8 of relay C by conductor 306.

Terminal T5 is connected to the wiping contact of bank 1 of switch S3 by conductor 307. Terminal T6 is connected to one side of the winding of relay C by conductor 308 and the other side of the winding of relay C is connected to movable contact 1 of relay C by conductor 309. One side of the winding of relay B is connected to conductor 308 by conductor 311 and the other side of the winding of relay B is connected to contact 3 of the pulsing contacts by conductor 312. One side of the winding of relay A is also connected to conductor 308 by conductor 313 and the other side of the winding of relay A is connected to the stationary contact 3 of relay C by conductor 314.

Terminal T7 is connected to stationary contact 9 of relay A by conductor 316 and terminal T8 is connected to one side of the motor 41 by conductor 317 and the other side of the motor 41 is connected to movable contact 8 of relay A by conductor 318. Terminal T9 is connected to one side of the step coil E by conductor 319 and the other side of the step coil E is connected to terminal T12 by conductor 321. Step coil D has one side connected to conductor 308 by conductor 322 and has the other side connected to movable contact 4 of relay B by conductor 323.

Terminal T10 is not used in this embodiment of the invention. Terminal T11 is connected to one side of the rectifier 44 by conductor 326 and the other side of the rectifier 44 is connected to stationary contact 7 of relay B by conductor 327. Terminal T11 is also connected to remote selecting apparatus of the type described in co-pending application Serial No. 506,513 filed on May 6, 1955, now issued into Patent No. 2,877,444 by any suitable means such as by wire or radio.

Movable contact 5 of relay C is connected to the stationary contact 7 of relay A by conductor 328. Conductor 328 is connected to conductor 301 by conductor 329.

Movable contact 1 of relay B is connected to terminal 52 of bank 2 of switch S3 by conductor 331 and stationary contact 2 of relay B is connected to resistor R4 and the other side of the resistor R4 is connected to conductor 312. Stationary contact 3 of relay B is connected to stationary contact 1 of step coil D by conductor 334 and stationary contact 5 of relay B is connected to stationary contact 1 of the pulsing contacts S5 by conductor 336. Movable contact 6 of relay B is connected to conductor 336 by conductor 337.

Stationary contact 1 of relay A is connected to terminals 1 through 50 of bank 1 of switch S3 by conductor 338, the terminals being interconnected. Movable contact 2 of relay A is connected to terminal 51 of bank 1 of switch S3 by conductor 339. Stationary contact 3 of relay A is connected to conductor 309 by conductor 341 and movable contact 6 of relay A is connected to conductor 331 by conductor 344.

Movable contact 2 of step coil D is connected to conductor 338 by conductor 346. Movable contact 1 of the step coil E is connected to conductor 319 by conductor 347 and the stationary contact 2 of step coil E is connected to off-normal contact 2 of switch S4 by conductor 348. Off-normal contact 1 of switch S4 is connected to movable contact 10 of relay C by conductor 349 and stationary contact 9 of relay C is connected to conductor 307 by conductor 350.

Terminals 1 to 20 of switch S2 are connected to terminals 1 to 20 of bank 2 of switch S3 by conductors 351 through 370. The wiping contact of switch S2 is connected to conductor 322 by conductor 371.

Terminals 21 through 51 of bank 2 of switch S3 are interconnected and are connected to conductor 371 by conductor 372. The wiping contact of bank 2 of switch S3 is connected to stationary contact 4 of pulsing contacts S5 by conductor 373. Movable contact 2 of pulsing contacts S5 is connected to conductor 331 by conductor 374.

Terminals 1 to 20 of switch S4 are connected to the corresponding terminals of switch S2 by connecting conductors 376 through 395 to conductors 351 through 370.

Movable contacts 1, 3 and 5 of relay F are interconnected and are connected to conductor 308 by conductor 396 and stationary contact 2 of relay F is connected to warning lamp 45 by conductor 397 and the other side of lamp 45 is connected to conductor 307 by conductor 398. Stationary contact 4 of relay F is connected to terminal T14 by conductor 399. Stationary contact 6 of relay F is connected to one side of the winding of relay F by conductor 401 and the other side of the winding of relay F is connected to the wiping contact of switch S4 by conductor 402. Resistor R5 has one end connected to conductor 402 and has the other end connected to conductor 398 by conductor 403. Terminal 13 is connected to stationary contact 6 of relay F by conductor 404.

One side of reset button 46 is connected to conductor 402 by conductor 406 and the other side of reset button 46 is connected to conductor 404 by conductor 407.

The operation of the embodiment of my invention shown in Figures 3 and 4 may now be briefly described as follows: Assuming that terminal T11 is connected to remote selecting apparatus 11 and that the remote selecting apparatus is connected to a plurality of transmitters 12 located at tanks 13, and also assuming that the wiping contact of switch S2 has been positioned at its terminal 1 to take a reading on the first transmitter of the transmitters 12, the operation is as follows.

It should first be pointed out that when the remote selecting apparatus 11 is on a home position, the remote selecting apparatus serves to maintain a ground continuously on the line connecting it to terminal T11 as described in my co-pending application Serial No. 506,513 filed May 6, 1955, now issued into Patent No. 2,877,444. Thus, when the apparatus shown in Figures 3 and 4 is in the home or resting position, relay L will be continuously energized and the ready light 29 will be lit continuously. This circuit is completed from the negative terminal of the D.C. power supply 26, through conductor 205, conductor 226, conductor 228, conductor 231, contacts 4 and 5 of relay K, conductor 229, conductor 216, the winding of relay L, conductor 217, resistor R2, adjustable tap 1 of resistor R2, conductor 218, terminal T11 to the ground maintained at the remote selecting apparatus 11.

Operation of the L relay energizes the ready lamp 29. This circuit is completed from the negative terminal of the D.C. power supply, through conductor 205, conductor 226, contacts 1 and 2 of relay L, conductor 227 to the wiping contact of bank 1 of switch S1, terminal 1 of switch S1, conductor 241, lamp 29, conductor 254, conductor 200 to ground.

When the ready light is glowing, start button 27 may be depressed which causes energization of relay K. This circuit is completed from the negative terminal of the D.C. power supply 26, through conductor 205, conductor 226, contacts 1 and 2 of the L relay, conductor 227, the wiping contact of bank 1 of switch S1, terminal 1 of switch S1, conductor 241, start button 27, conductor 239, contacts 7 and 8 of relay K, conductor 232, resistance R1, conductor 233, conductor 214, the winding of relay K, conductor 215, conductor 206 to the positive terminal of the D.C. power supply 26.

The energization of relay K closes its contacts 9 and 10 to establish a holding circuit for relay K. This circuit is completed from the negative terminal of the D.C. power supply 26, through conductor 205, conductor 226, conductor 228, conductor 243, contacts 9 and 10 of relay K, conductor 242, conductor 232, resistance R1, conductor 233, conductor 214, the winding of relay K, conductor 215, conductor 206 to the positive terminal of the D.C. power supply. This permits release of start button 27.

The closing of contacts 5 and 6 of relay K by energization of relay K places a negative voltage on terminal T3. This circuit can be traced from the negative terminal of the D.C. power supply 26, through conductor 205, conductor 226, conductor 228, conductor 231, contacts 5 and 6 of relay K, conductor 203 to terminal T3.

Closing of contacts 2 and 3 of relay K by energization of relay K places the negative D.C. voltage on terminal T1. This circuit can be traced from conductor 228, through contacts 2 and 3 of relay K, conductor 201 to terminal T1.

The placing of a negative D.C. voltage on terminal T1 causes operation of relay A. This circuit is completed from the negative voltage on terminal T1, through conductor 301, contacts 3 and 4 of relay C, conductor 314, the winding of relay A, conductor 313, conductor 308, terminal T6, conductor 206 to ground.

The energization of relay A closes its contacts 8 and 9 to energize motor 41 which is connected to terminals T7 and T8 which in turn are connected to the 110 volt 60 cycle alternating current. The motor 41 serves to rotate the cam 42 to cause periodic opening and closing of the pulsing contacts of S5.

The closing of contacts 6 and 7 of relay A places a negative voltage on contact 4 of the pulsing contacts S5 so that when contacts 3 and 4 of S5 are closed, relay B is energized. This circuit is completed from the negative voltage on terminal T1 through conductor 301, conductor 329, conductor 328, contacts 6 and 7 of relay A, conductor 344, conductor 331, terminal 52 of bank 2 of switch S3, the wiping contact of bank 2 of switch S3, conductor 373 to stationary contact 4 of the pulsing contacts S5 and then when the cam 42 next allows the contacts 3 and 4 to close, the circuit is continued through contact 3 of pulsing contacts S5, conductor 312, the winding of relay B, conductor 311, conductor 308, terminal T6, conductor 206 to ground.

The energization of relay B closes its contacts 1 and 2 which establish a holding circuit for relay B. This circuit is completed from the negative voltage on terminal T1, through conductor 301, conductor 329, conductor 328, contacts 6 and 7 of relay A, conductor 344, conductor 331, contacts 1 and 2 of relay B, resistance R4, conductor 312, the winding of relay B, conductor 311, conductor 308, terminal T6 to ground.

Contacts 6 and 7 of relay B are closed by energization of relay B and serve to send pulses over terminal T11 to the remote selecting apparatus 11. The circuit is completed from a negative voltage on terminal T1 through conductor 301, conductor 329, conductor 328, contacts 6 and 7 of relay A, conductor 344, conductor 331, conductor 374, contacts 1 and 2 of pulsing contacts S5, conductor 336, conductor 337, contacts 6 and 7 of relay B, conductor 327, rectifier 44, conductor 326, terminal T11 to ground at the remote selecting apparatus 11. Thus it is apparent that as the cam 42 rotates and the contacts 1 and 2 of pulsing contacts S5 are periodically closed, that a series of pulses will be sent to the remote selecting apparatus 11. It is also apparent that only complete pulses will be sent out to the remote selecting apparatus 11 because relay B can only be initially energized when contacts 3 and 4 of pulsing contacts S5 are closed and when contacts 1 and 2 of pulsing contacts S5 are open.

At the same time relay B is energized, its contacts 4 and 5 are closed to energize the step coil D. Switch S3 is back acting so that each release or de-energization of step coil D advances the wiping contact of switch S3 one step. This circuit is completed from the negative voltage on terminal T1 through conductor 301, conductor 329, conductor 328, contacts 6 and 7 of relay A, conductor 344, conductor 331, conductor 374, contacts 1 and 2 of impulse switch S5, conductor 336, contacts 4 and 5 of relay B, conductor 323, coil D, conductor 322, conductor 308, terminal T6 to ground. Thus, switch S3 is advanced one step for every pulse sent out through terminal T11 to the remote selecting apparatus 11 until the wiping contact of bank 2 of switch S3 finds the ground which is established by switch S2 on one of the terminals of bank 2 of switch S3. In this instance, switch S2 is on terminal 1 and relay B will be denergized after the termination of the first pulse sent out through terminal T11 because the wiping contact of bank 2 of switch S3 establishes a parallel circuit and shunts relay B. The shunt circuit may be traced from the winding of relay B through conductor 312, contacts 3 and 4 of impulse switch S5, conductor 373, wiping contact of bank 2 of switch S3, terminal 1 of bank 2 of switch S3, conductor 351, terminal 1 of switch S2, wiping contact of switch S2, conductor 371, conductor 322, conductor 308, conductor 311, to coil of relay B. This provides a shunt path directly across the coil of relay B causing it to drop out. Resistance R4 in the path of the energizing circuit of relay B prevents a direct short on the power supply.

Since terminal 1 of switch S2 was selected, only one pulse will be sent out over terminal T11. However, it is apparent that if, for instance, terminal 18 had been selected by switch S2, that switch S3 would be advanced until the wiping contact of bank 2 engaged terminal 18 of bank 2 to find a ground to de-energize relay B. In this instance, eighteen pulses would be sent out to terminal T11 before relay B would be de-energized.

As soon as relay B is de-energized, contacts 3 and 4 of relay B are closed causing switch S3 to step rapidly to terminal 51. This circuit is completed from the negative terminal of the D.C. power supply 26, through conductor 205, terminal T5, conductor 307, the wiping contact of bank 1 of switch S3, terminal 1 of bank 1 of switch S3, conductor 338, conductor 346, normally closed contacts 1 and 2 of step coil D, conductor 334, contacts 3 and 4 of relay B, conductor 323, step coil D, conductor 322, conductor 308, terminal T6 to ground. Thus, step coil D is energized. However, as soon as the step coil D is energized, contacts 1 and 2 of step coil D are opened causing de-energization of step coil D which causes the wiping contacts of switch S3 to advance to the next position which in this case would be terminal 2. De-energization of step coil D releases its contacts 1 and 2 which again close the circuit to energize step coil D. Thus, step coil D is periodically energized until the wiping contact of bank 1 of switch S3 reaches terminal 51 and removes the negative voltage from the circuit to coil D. Terminals 1 to 50 of bank 1 of switch S3 are normally connected to stationary contact 1 of relay A and since relay A is normally energized during this stepping operation, contacts 1 and 2 of relay A will not be closed.

However, if a power failure should have occurred between the operation of the start button 27 and the aforementioned stepping operation, contacts 1 and 2 of relay A will be closed and stepping will continue until the wiping contacts reach the home position at terminals 52.

Since contacts 2 and 3 of relay A are normally closed when the wiping contact of bank 1 of switch S3 arrives at terminal 51 of bank 1, the negative voltage will be applied to contacts 2 and 3 of relay A to energize relay C. This circuit is completed from contacts 2 and 3 of relay A through conductor 341, conductor 309, the coil of relay C, conductor 308, terminal T6 to ground.

Operation of relay C closes its contacts 1 and 2 establishing a holding circuit for relay C. This circuit is completed from the negative voltage on terminal T1 through conductor 301, conductor 302, contacts 1 and 2 of relay C, conductor 309, the winding of relay C, conductor 308, terminal T6 to ground. The opening of normally closed contacts 3 and 4 of relay C by energization of relay C de-energizes relay A which in turn causes step switch S3 to be advanced to terminal 52. The circuit for energizing the step coil D to cause this last step is completed from the negative voltage on terminal T5, through conductor 307, the wiping contact of bank 1 of switch S3, terminal 51 of bank 1, conductor 339, contacts 1 and 2 of relay A, conductor 338, conductor 346, contacts 1 and 2 of step coil D, conductor 334, contacts 3 and 4 of relay B, conductor 323, step coil D, conductor 322, conductor 308, terminal T6 to ground.

Closing of contacts 5 and 6 of relay C by energization of relay C causes energization of relay T to control the transmission of a start pulse to terminal T11 to the remote selecting apparatus 11. Closing of contacts 5 and 6 also causes energization of step coil N. The circuit for energizing step coil N is completed from the negative terminal of the D.C. power supply 26, through conductor 205, conductor 226, conductor 228, contacts 2 and 3 of relay K, conductor 201, terminal T1, conductor 301, conductor 329, contacts 5 and 6 of relay C, conductor 303, terminal T2, conductor 202, contacts 1 and 2 of relay P, conductor 244, step coil N, conductor 246, the wiping contact of bank 2 of switch S1, terminal 1 of bank 2 of switch S1, conductor 261, conductor 269, conductor 271, conductor 215, conductor 206 to the positive terminal of the D.C. power supply 26. The circuit for energizing relay T is identical through conductor 202 after which the circuit goes through conductor 238, the winding of relay T, conductor 237, conductor 215, conductor 206 to ground.

The circuit for sending the start pulse over terminal T11 is completed from the negative terminal of the D.C. power supply 26, through conductor 205, conductor 226, conductor 228, conductor 231, contacts 5 and 6 of relay K, conductor 203, terminal T3, conductor 304, contacts 7 and 8 of relay C, conductor 306, terminal T4, conductor 204, contacts 1 and 2 of relay T, conductor 211, terminal T11 to ground at the selected transmitter 12. As pointed out previously, relay T is of the "slow to operate" type and the start pulse is terminated when contacts 1 and 2 of relay T are opened.

As hereinbefore described, at the same time that relay T is energized, step coil N is energized causing the wiping contacts of switch S1 to be advanced from terminals 1 to terminals 2. The apparatus is now in condition to receive confirming code pulses from the selected transmitter 12 to determine whether or not the remote selecting apparatus 11 made the proper selection. The code pulses are sent by the transmitter by having the transmitter periodically place a ground on the line connecting the transmitter to the remote selecting apparatus 11 and to the terminal T11 in the manner described in co-pending application Serial No. 342,402 filed March 16, 1953 in the names of Ellsworth A. Hosmer, Jack S. Hawley and Albert E. Jurs, Jr. The first ground placed on the terminal T11 by the transmitter causes operation of relay L. This circuit is completed from the negative terminal of the D.C. power supply 26, through conductor 205, conductor 226, conductor 228, conductor 231, contacts 5 and 6 of relay K, conductor 203, terminal T3, conductor 304, contacts 7 and 8 of relay C, conductor 306, terminal T4, conductor 204, contacts 2 and 3 of relay T, conductor 216, the winding of relay L, conductor 217, resistance R2, adjustable tap 1 of resistance R2, conductor 218, terminal T11 to the ground established by the remotely located transmitter 12.

As previously explained the rectifier 30 in parallel with the resistance R2 cooperates with the resistance R2 to produce a delay in the drop out time of relay L and provides means for making adjustments to correct for distortion, caused by line 21 connecting terminal T11 to the remote selecting apparatus 11 and line 22 connecting remote selecting apparatus 11 to the transmitter 12.

Operation of relay L causes a pulse to be sent through terminal 2 of bank 1 of switch S1 to terminal T9 to cause energization of the step coil E to advance switch S4 from terminal 0 to terminal 1. This circuit is completed from the negative terminal of the D.C. power supply, through conductor 205, conductor 226, contacts 1 and 2 of relay L, conductor 227, the wiping contact of bank 1 of switch S1, terminal 2 of bank 1 of switch S1, conductor 209, terminal T9, conductor 319, step coil E, conductor 321, terminal T12, conductor 212, contacts 1 and 2 of time delay device TD–1, conductor 269, conductor 271, conductor 215, conductor 206 to the positive terminal of the power supply 26.

Closing of contacts 1 and 2 of relay L also causes energization of relay P causing it to open its contacts 1 and 2. This circuit is completed from the negative terminal of the D. C. power supply 26, through conductor 205, conductor 226, contacts 1 and 2 of relay L, conductor 227, conductor 247, the winding of relay P, conductor 248, conductor 215, conductor 206, to the positive terminal of the D.C. power supply 26.

As soon as the ground on lines 21 and 22 is terminated by the transmitter 12, relay L will be de-energized. When the next ground is placed on the terminal T11, relay L is again energized causing another pulse to be sent to terminal T9 to energize the step coil E to advance the switch S4 another step. Thus, it is apparent that relay L follows the pulses and that switch S4 will be advanced one step for each pulse.

In the present instance, the first transmitter was selected by switch S2 and hence only one confirming pulse would be received by switch S4 and hence it would be advanced to terminal 1 only. Engagement of the wiping contact of switch S4 with the terminal 1 will place a ground on one side of the winding of relay F. This can be traced from the winding of relay F through conductor 402, wiping contact of switch S4, terminal 1 of switch S4, conductor 376, conductor 351, terminal 1 of switch S2, wiping contact of switch S2, conductor 371, conductor 322, conductor 308, terminal T6 to ground.

Relay F is provided to confirm proper transmitter selection. As hereinafter described, if the selection is proper, relay F will not be operated and the apparatus will complete its sequence of operations. However, if the selection is not properly confirmed, relay F will be operated, and the apparatus will be reset automatically and warning lamp 45 will be lit to show faulty operation.

As previously explained, relay P is of the slow release type, the release time being such that it remains operated between pulses and hence does not follow the pulses sent in through terminal T11. However, as soon as the confirming code pulses have been transmitted, which in this instance would be one, a predetermined interval elapses before additional information is sent by the transmitter 12. During this interval, relay P releases and closes its contacts 1 and 2 to cause energization of step coil N through a circuit previously described, except in this instance the circuit would be completed through terminal 2 and conductor 262 of bank 2 rather than through terminal 1 of bank 2. Energization of step coil N causes step switch S1 to be advanced from terminal 2 to terminal 3, after which the apparatus is in condition for the reception of additional information which in this instance can consist of a plurality of pulses indicating the number of feet of liquid in a tank 13.

Advancement of step switch S1 to terminal 3 places a ground on one side of the winding of relay F and if the other side has not been grounded by the wiping contact of switch S4, as hereinbefore described, then relay F will be operated.

This circuit is completed from the negative terminal of power supply 26, through conductor 205, terminal T5, conductor 307, conductor 398, conductor 403, resistor R5, winding of relay F, conductor 401, conductor 404, terminal T13, conductor 213, wiping contact of bank 3 of switch S1, terminal 3 of bank 3 of switch S1, conductor 268, conductor 261, conductor 269, conductor 271, conductor 215, conductor 206 to the positive terminal of the power supply.

However, if the operation is proper, relay F will not be operated because it will be shunted by switch S4. This circuit is completed from the negative voltage through resistor R5 as previously described and then through conductor 402, the wiping contact of switch S4, terminal 1 of switch S4, conductor 376, conductor 351, terminal 1 of switch S2, the wiping contact of switch S2, conductor 371, conductor 322, conductor 308, terminal T6 to ground.

If for any reason switch S1 does not advance to position 3, then upon elapse of the predetermined time interval time delay device TD–1, its contacts 2 and 3 will be closed placing a ground on one side of the winding of relay F to cause it to operate. This circuit is completed from the negative terminal of power supply 26, through conductor 205, terminal T5, conductor 307, conductor 398, conductor 403, resistor R5, coil of relay F, conductor 401, conductor 404, terminal T13, conductor 213, the wiping contact of bank 3 of switch S1, terminal 1 or 2 of bank 3 of switch S1, conductor 266 or 267 and 266, contacts 2 and 3 of time delay device TD–1, conductor 269, conductor 271, conductor 215, conductor 206 to the positive terminal of power supply 26.

Energization of relay F closes its contacts 1 and 2 which lights lamp 45 to indicate faulty operation. This circuit is completed from the negative terminal of power supply 26, through conductor 205, terminal T5, conductor 307, conductor 398, lamp 45, conductor 397, contacts 1 and 2 of relay F, conductor 396, terminal T6 to ground.

Energization of relay F also closes its contacts 3 and 4 which shunt the winding of relay K to cause its release to accomplish restoration of the apparatus to the "home" position as hereinafter described. This shunt circuit on the winding of relay K is completed from the winding of relay K through conductor 215, conductor 206, terminal T6, conductor 308, conductor 396, contacts 3 and 4 of relay F, conductor 399, terminal T14, conductor 214 to the other side of the winding of relay K.

However, relay F remains in a "locked" or energized position. This holding circuit is completed from the negative terminal of the power supply 26 through conductor 205, terminal T5, conductor 307, conductor 398, conductor 403, resistor R5, the winding of relay F, conductor 401, contacts 5 and 6 of relay F, conductor 396, conductor 308, terminal T6 to ground.

Since the winding of relay K is shunted by contacts 3 and 4 of relay F, start button 27 can have no effect until relay F is de-energized. Relay F is de-energized by pressing button 46 which shunts the winding of relay F. This shunt circuit is completed from one side of the winding of relay F through conductor 402, conductor 406, reset button 46, conductor 407, conductor 404, conductor 401 to the other side of the winding of relay F. Relay F will remain de-energized because its holding circuit is broken by opening of its contacts 5 and 6.

After relay F has been released, the operator may start the same reading operation again by pressing start butten 27.

Assuming that the wiping contact of switch S4 is on the proper terminal so that relay F will not be operated, or if misoperation has occurred that the apparatus has been operated as hereinbefore described until proper operation has occurred, the following sequence of operations takes place thereafter.

After transmission of confirming code pulses, the selected transmitter 12 sends pulses indicating feet by periodically establishing a ground on line 22 connecting it to the remote selecting apparatus 11 and line 21 connecting the remote selecting apparatus 11 to terminal T11 to cause periodic operation of the relay L which causes a plurality of pulses to be sent over terminal 3 of switch S1 to indicating step coil 31. This circuit is completed from the negative terminal of the D.C. power supply through conductor 205, conductor 226, contacts 1 and 2 of relay L, conductor 227, wiping contact of bank 1 of switch S1, terminal 3 of bank 1 of switch S1, conductor 256, step coil 31, conductor 257, conductor 254, conductor 200 to ground. Thus, relay L will cause a series of pulses to be sent to the step coil 31 equal to the number of pulses sent from the transmitter 12.

Operation of relay L again causes energization of relay P which again does not follow the pulses and therefore maintains contacts 1 and 2 of relay P in an open condition during reception of the foot pulses.

Again a predetermined interval elapses between the completion of the foot pulses and the transmission of the inch pulses during which relay P will again release to allow closing of its contacts 1 and 2 to energize step coil N.

It should be noted that energization of relay T causes closure of its contacts 4 and 5 to energize the motors of the time delay devices TD–1 and TD–2, thereby starting them in operation at the commencement of the start pulse. The time delay device TD–1 has been set to operate during the time in which the foot pulses normally should have been received. Thus the circuit for energizing the step coil N after completion of the foot pulses is from the negative terminal of the D.C. battery 26, through conductor 205, conductor 226, conductor 228, contacts 2 and 3 of relay K, conductor 201, terminal T1, conductor 301, conductor 329, contacts 5 and 6 of relay C, conductor 303, terminal T2, conductor 202, contacts 1 and 2 of relay P, conductor 224, step coil N, conductor 246, wiping contact of bank 2 of switch S1, terminal 3 of bank 2 of switch S1, conductor 263, contacts 2 and 3 of TD–1, conductor 269, conductor 271, conductor 215, conductor 206 to the positive terminal of the D.C. power supply.

The time delay device TD–1 takes care of the contingency when no foot pulses are received. When no foot pulses are received, relay P will not be energized and de-energized in the normal manner to open and close its contacts 1 and 2 to send another pulse through the step coil N. However, after a predetermined interval, contacts 2 and 3 of TD–1 are closed to complete a circuit for energization of the step coil N.

Energization of step coil N causes the wiping contacts of switch S1 to be advanced from terminals 3 to terminals 4 to place the apparatus in condition for receiving additional information from the transmitter.

After a predetermined interval has elapsed the transmitter 12 transmits additional information which in this instance can consist of pulses indicating the number of inches in the tank 13 after the foot information has been transmitted. Again the transmitter is adapted to place a periodic ground on lines 21 and 22 connecting the transmitter 12 to the remote selecting apparatus and the terminal T11. Relay L again follows the pulses and causes an equal number of pulses to be sent over terminal 4 of bank 1 of switch S1 to indicator step coil 32. Relay P again remains operated during the transmission of these inch pulses and after the completion of the transmission of the inch pulses again releases the movable contact 1 to close its contacts 1 and 2 to energize step coil N to advance the wiping contacts of switch S1 from terminals 4 to terminals 5.

The time delay device TD–2 has been set for a predetermined time interval so that its contacts will be operated during the time in which the inch pulses normally would be received. It provides the means for energizing step coil N in the contingency when no inch pulses are transmitted, as for example, when the liquid level in the tank is six feet and zero inches. The circuit is completed from the negative terminal of the D.C. power supply 26, through conductor 205, conductor 226, conductor 228, contacts 2 and 3 of relay K, conductor 201, terminal T1, conductor 301, conductor 329, contacts 5 and 6 of relay C, conductor 303, terminals T2, conductor 202, contacts 1 and 2 of relay P, conductor 244, step coil N, conductor 246, the wiping contact of bank 2 of switch S1, terminal 4 of bank 2, conductor 264, contacts 2 and 3 of TD–2, conductor 261, conductor 269, conductor 271, conductor 215, conductor 206 to the positive terminal of the D.C. power supply.

Similar means may be provided for receiving additional series of information transmitted from the transmitter 12. However, in this instance, I have only shown means for receiving a series of confirming code pulses, a series of foot pulses, and a series of inch pulses.

After switch S1 has been advanced to terminal 5, the apparatus is in condition to be reset to return the same to its "home" position. This is accomplished by operating the reset button 28 which causes de-energization of the K relay by establishing a circuit in parallel with the coil of relay K to shunt the same and cause its de-energization. This circuit is established from the coil of relay K through conductor 214, conductor 277, reset button 28, conductor 278, conductor 254, conductor 206, conductor 215, to coil of relay K. Resistance R1 prevents a direct short on the power supply 26.

De-energization of relay K closes contacts 1 and 2 and energizes reset coil M and indicator reset coils 33 and 34. The circuit for energizing reset coil M is completed from the negative terminal of the D.C. power supply 26 through conductor 205, conductor 226, conductor 228, contacts 1 and 2 of relay K, conductor 210, conductor 249, off-normal contacts 1 and 2, conductor 251, coil M, conductor 252, conductor 248, conductor 215, conductor 206 to the positive terminal of the D.C. power supply. The circuit for energizing indicator reset coil 33 is completed from conductor 210, conductor 272, indicator reset coil 33, conductor 273, conductor 259, conductor 257, conductor 254, conductor 200 to ground. Indicator reset coil 34 is connected in parallel with indicator reset coil 33 by conductors 274 and 276 and hence is energized at the same time.

The de-energization of relay K opens its contacts 2 and 3 and 5 and 6 to remove the negative potential of the D.C. power supply from terminals T1 and T3, and therefore de-energizes relays T and C. The de-energization of relay T opens its contacts 4 and 5 to de-energize the motors for TD–1 and TD–2. As previously explained, the time delay devices TD–1 and TD–2 are provided with means whereby they are automatically reset upon de-energization.

De-energization of relay C closes its contacts 9 and 10 providing a circuit for energizing step coil E to make it advance itself to its "home" position. This circuit is completed from the negative terminal of the D.C. power supply through conductor 205, terminal T5, conductor 307, conductor 350, contacts 9 and 10 of relay C, conductor 349, off-normal contacts 1 and 2 of switch S4, conductor 348, normally closed contacts 1 and 2 of step coil E, conductor 347, conductor 319, step coil E, conductor 321, terminal T12, conductor 212, contacts 1 and 2 of TD–1, conductor 269, conductor 271, conductor 215, conductor 206 to the positive terminal of the power supply 26. The switch S4 will continue to step until the circuit is broken by the off-normal contacts of switch S4 when the switch S4 reaches "home" position.

It is to be noted that in the sequence of operation just described, it might appear that ground on terminal 5 of bank 3 of switch S1 would cause false operation of relay F. However, since switch S1 responds very rapidly to its reset coil and time delay device TD–1 does not respond very rapidly to its reset coil (not shown), operating conditions are not established for relay F.

As disclosed in co-pending application Serial No. 506,513 filed May 6, 1955, now issued into Patent No. 2,877,444 the remote selecting apparatus 11 is also provided with means for automatically homing itself after a predetermined interval of time. In the home position, it again establishes a ground on line 21 connecting it to the terminal T11 which causes operation of relay L and energization of the lamp 29 to indicate that the apparatus is again in condition for another reading operation.

Rectifier 44 in Figure 4 is provided to preclude the inductive kick of the step coils from being sent through terminal T11 to line 21.

The terminals of bank 2 of switch S1 are of the bridging type and are provided so that the wiping contact of bank 2 will maintain in contact with the preceding contact a little longer to insure that it will be moved to the next contact. Banks 1 and 3 of switch S1 are of the non-bridging type.

Figure 5:
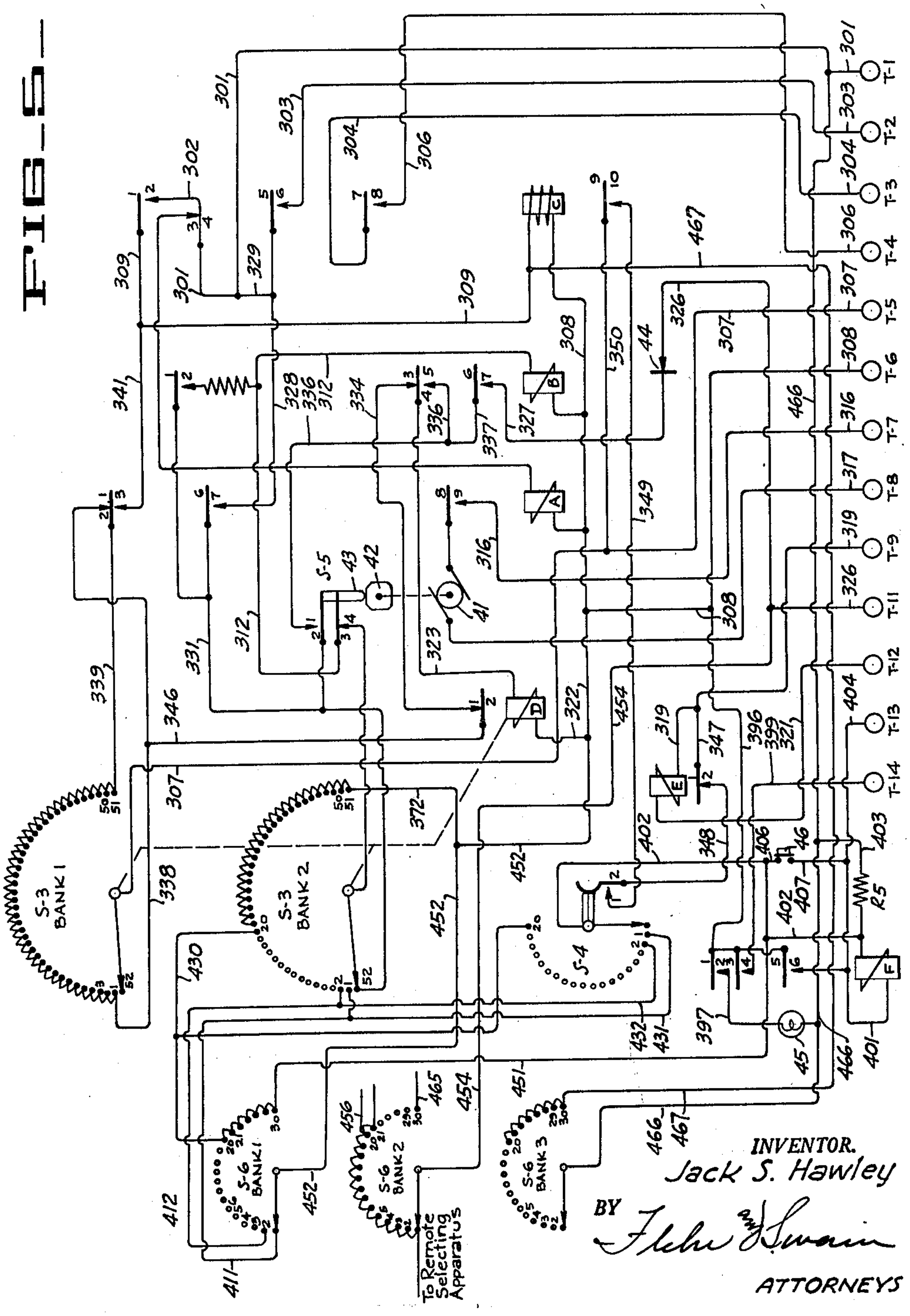
Figure 5 is a circuit diagram of a portion of one embodiment of my invention illustrating a selecting and receiving system and apparatus of the type also adapted to be used with the routing apparatus of Figure 3 for remote and local selection and which is adapted to transmit a single series of selecting pulses and to receive a single series of confirming code pulses.

In Figure 5, I have shown a modification of the selecting and receiving apparatus shown in Figure 4 in that additional means have been provided for direct selection of certain transmitters which are located near the reading station 10. In the apparatus shown in Figure 5, a three bank selector switch S6 has been substituted for manual selector switch S2 in Figure 4. Each of the banks of switch S6 is provided with 30 terminals numbered 1 to 30. Terminals 1 to 20 of bank 1 of switch S6 are connected to terminals 1 to 20 of bank 2 of switch S3 by conductors 411 through 430 respectively. Terminals 1 to 20 of switch S4 have been connected to conductors 411 to 430 by conductors 431 through 450 respectively. Terminals 21 to 30 of bank 1 of switch S6 have been interconnected and are connected to conductor 402 by conductor 451. The wiping contact of bank 1 of switch S6 is connected to conductors 372 and 322 by conductor 452.

The wiping contact of bank 2 of switch S6 is connected to conductor 326 by conductor 454. Terminals 1 to 20 of bank 2 of switch S6 are interconnected and are connected to remote selecting apparatus 11. Terminals 21 through 30 of bank 2 of switch S6 are connected to local transmitters 12 by conductors 456 through 465. Thus, local transmitters can be directly selected by the selector switch S6. If it is desired to increase the capacity for reading local transmitters, it is merely necessary to add additional terminals to switch S6.

The wiping contact of bank 3 of switch S6 is connected to conductor 301 by conductor 466. Terminals 1 to 20 of bank 3 of switch S6 are not used, but terminals 21 to 30 are interconnected and are connected to conductor 309 by conductor 467.

The operation of the modification of my selecting and receiving apparatus shown in Figure 5 in conjunction with the apparatus shown in Figure 3 may be briefly described as follows: When it is desired to select a remotely located tank and transmitter, switch S6 is rotated to the proper terminal. Bank 1 of switch S6 grounds the corresponding terminals of bank 2 of switch S3 and S4 in a manner similar to switch S2 in Figure 4. Bank 2 of switch S6 connects terminal T11 to remote selecting apparatus 11. Bank 3 of switch S6 has no effect. The apparatus then operates in a manner substantially similar to the operation of the apparatus shown in Figure 4.

When it is desired to select a local transmitter and tank, switch S6 is rotated to the proper terminal connected to a local transmitter. Bank 1 of switch S6 serves to shunt relay F by grounding conductor 402. This circuit is completed from conductor 402 through conductors 451, the interconnected terminals 21 through 30 of bank 1 of switch S6, wiping contact of bank 1 of switch S6, conductor 452, conductor 322, conductor 308 and terminal T6 to ground. Relay F is shunted because code confirmation is not required when direct selection of the transmitter is used.

Bank 2 of switch S6 connects terminal T11 to the selected local transmitter 12. This causes energization of relay L by the local transmitter 12 which causes operation of ready light 29. This circuit can be completed from the negative terminal of the D.C. power supply 26 through conductor 205, conductor 226, conductor 228, conductor 231, contacts 4 and 5 of relay K, conductor 229, coil of relay L, conductor 217, resistance R2, adjustable tap 1, conductor 218, terminal T11, conductor 326, conductor 454, wiping contact of bank 2 of switch S6 to ground at the locally selected transmitter 12.

Bank 3 of switch S6 causes energization of relay C to cause it to operate immediately. The circuit for energizing relay C can be completed from the negative terminal of the D.C. power supply 26 through conductor 201, terminal T1, conductor 301, conductor 466, wiping contact of bank 3 of switch S6, interconnected terminals 20 through 30 of bank 3 of switch S6, conductor 467, conductor 309, coil of relay C, conductor 308, terminal T6 to ground.

Operation of relay C opens the energizing circuit for relay A by opening of contacts 3 and 4 of relay C and prevents its operation which in turn prevents the transmission of selecting pulses. The operation of relay C also serves to connect terminal T1 to terminal T2 and to connect terminal T3 to T4 as previously described. This places the apparatus in a condition similar to that described in Figure 2 so that pressing the start button 27 causes immediate transmission of a start pulse to the locally selected transmitter 12 to cause it to send predetermined information as hereinbefore described. This information will be received on terminal T11 as described for Figures 3 and 4, except that the code pulses will not be utilized. After completion of the reading operation, the reset button 28 is pressed to restore the apparatus to its "home" position, after which another local or remote reading operation may be initiated.

Figure 6:
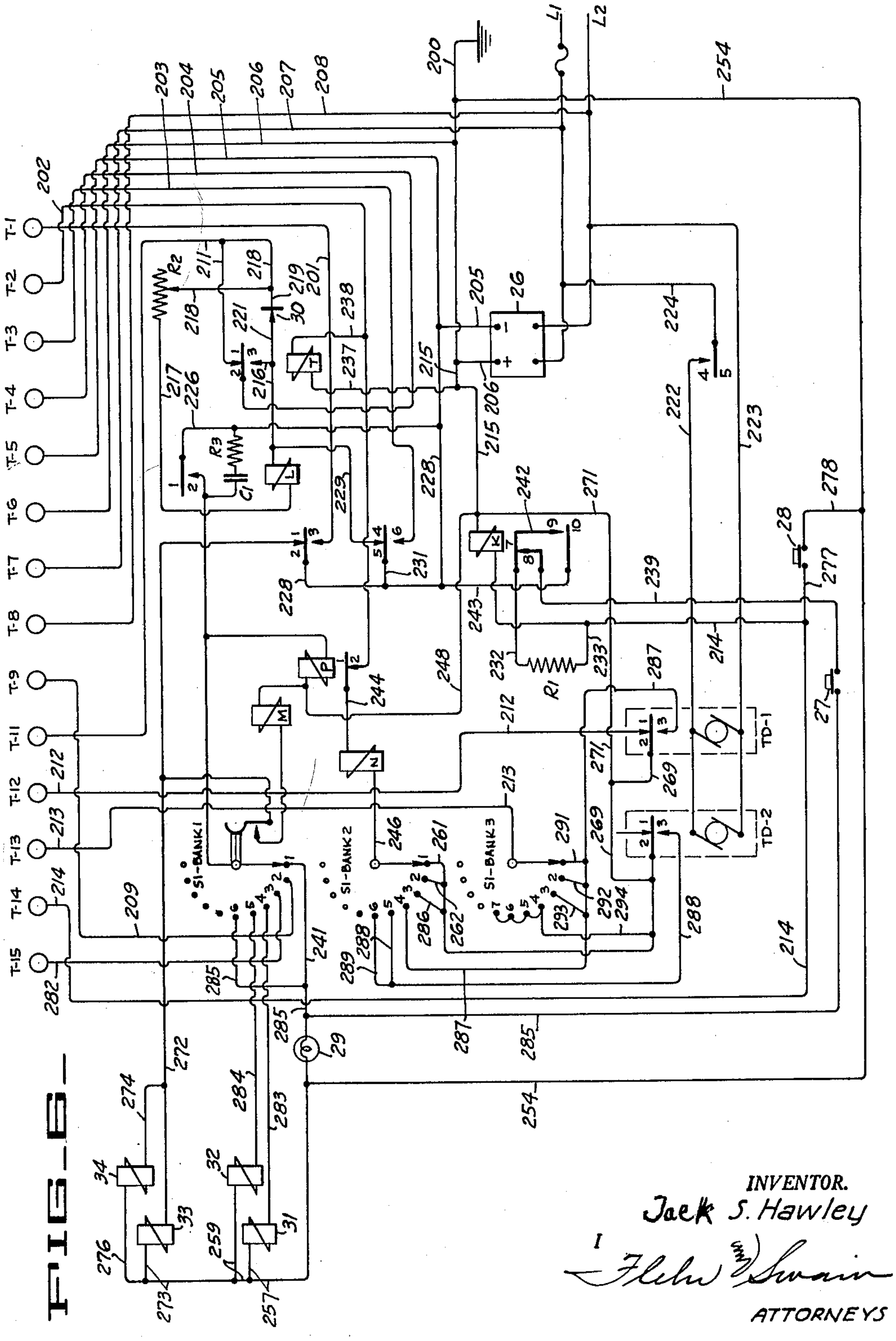
Figure 6 is a circuit diagram of a portion of another embodiment of my invention illustrating a routing system and apparatus adapted for remote selection and for reception of two series of code pulses.

In Figure 6, I have shown a modification of the signal routing apparatus as shown in Figure 3, the modification being that the signal routing apparatus has provisions for the reception of two series of code pulses from the transmitter 12.

In the apparatus shown in Figure 6, terminal 3 of bank 1 of switch S1 has been connected to terminal T15 by conductor 282. Terminal 4 of bank 1 has been connected to one side of the indicator step coil 31 by conductor 283 and terminal 5 of bank 1 has been connected to one side of the indicator step coil 32 by conductor 284. Terminal 6 of bank 1 has been connected to one side of the start button 27 by conductor 285. Terminal 3 of bank 2 of switch S1 has been connected to conductor 261 by conductor 286 and terminal 4 of bank 2 has been connected to stationary contact 3 of TD–1 by conductor 287. Terminal 5 of bank 2 has been connected to stationary contact 3 of TD–2 by conductor 288. Terminal 6 of bank 2 is connected to conductor 288 by conductor 289.

Terminals 1, 2 and 3 of bank 3 of switch S1 have been connected to conductor 287 by conductors 291, 292 and 293 respectively. Terminals 4, 5, 6 and 7 of bank 3 of switch S1 have been interconnected and are connected to conductor 261 by conductor 294.

The operation of this apparatus in Figure 6 will be described in conjunction with Figure 7 hereinafter described.

Figure 7:
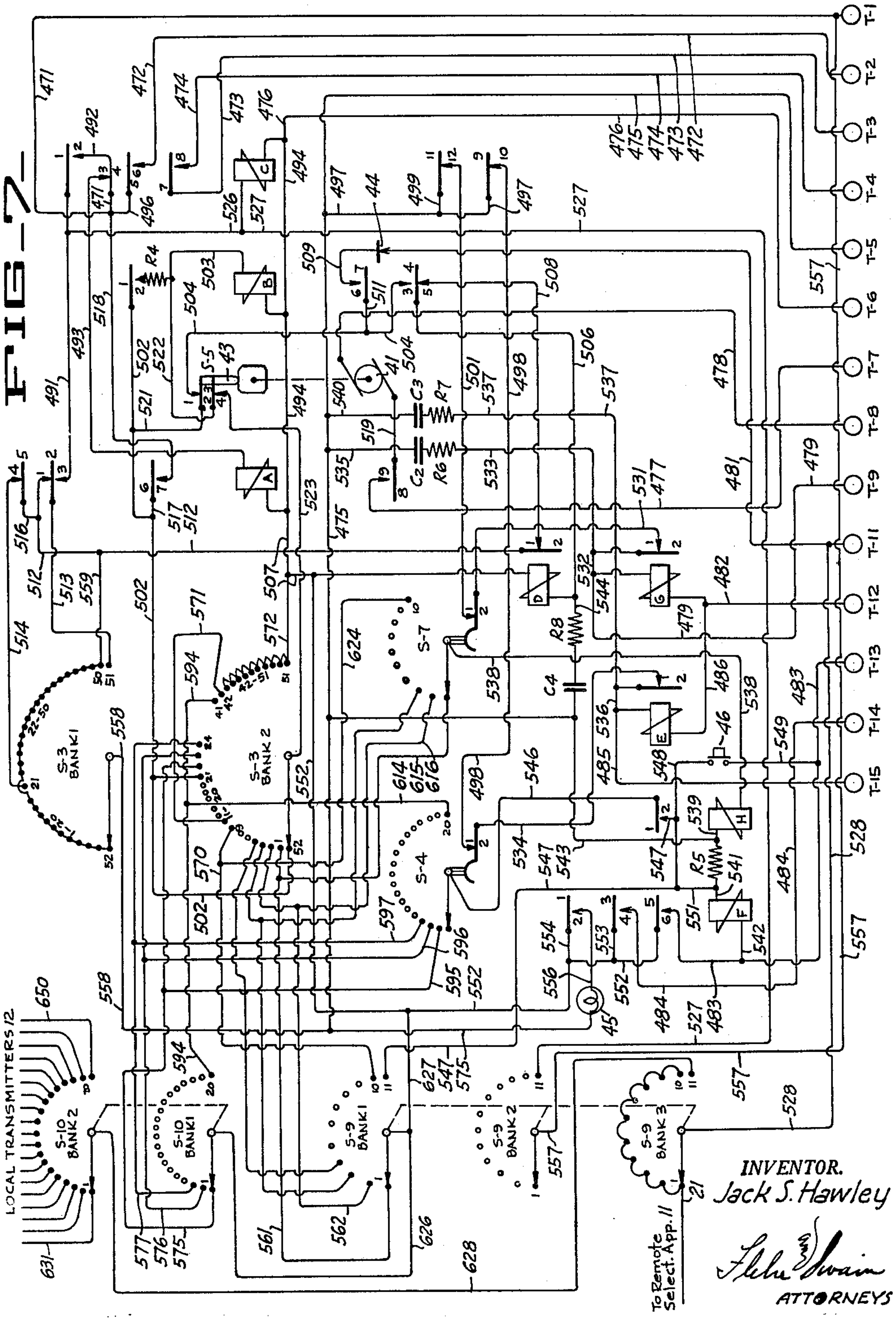
Figure 7 is a circuit diagram of a portion of another embodiment of my invention illustrating a selecting and receiving system and apparatus adapted to be used in conjunction with the routing system and apparatus of Figure 6 and which is adapted to transmit two series of selecting pulses and receive two series of confirming code pulses.

In Figure 7 I have shown another embodiment of my selecting and receiving system and apparatus of the type shown in Figure 4 in which means has been provided for sending two series of selecting pulses and receiving two separate series of confirming code pulses together with warning means to give an indication when an improper transmitter has been selected by the remote selecting apparatus 11.

As shown schematically in the circuit diagram of Figure 7, the selecting and receiving system and apparatus consists of substantially the same components as the apparatus shown in Figure 4 with the following additions and modifications. Relay A has been provided with an additional set of contacts 4 and 5, and relay C has been provided with an additional set of contacts 11 and 12. An additional terminal T15, a step switch S7 with off-normal contacts 1 and 2, a step coil G with its normally closed contacts 1 and 2, a relay H with contacts 1 and 2, a three-bank stepping switch S9, each bank being provided with terminals 1 through 20, a two-bank stepping switch S10, each bank being provided with terminals 1 through 11, condensers C1, C2 and C3, and resistors R6, R7 and R8, have also been included.

The above components in Figure 7 are connected together in the following manner. Terminal T1 is connected to stationary contact 4 of relay C by conductor 471. Terminal T2 is connected to contact 6 of relay C by conductor 472 and terminal T3 is connected to movable contact 7 of relay C by conductor 473. Terminal T4 is connected to stationary contact 8 by conductor 474 and terminal T5 is connected to one side of lamp 45 by conductor 475. Terminal T6 is connected to one side of the winding of relay C by conductor 476 and terminal T7 is connected to stationary contact 9 of relay A by conductor 477. Terminal T8 is connected to one side of the motor 41 by conductor 478. Terminal T9 is connected to one side of step coil G by conductor 479. Terminal T11 is connected to one side of rectifier 44 by conductor 481. Terminal T12 is connected to the other side of the winding of step coil G by conductor 482 and terminal T13 is connected to stationary contact 6 of relay F by conductor 483. Terminal T14 is connected to stationary contact 4 of relay F by conductor 484 and terminal T15 is connected to one side of step coil E by conductor 485 and the other side of step coil E is connected to conductor 482 by conductor 486.

Movable contact 1 of relay C is connected to stationary contact 3 of relay A by conductor 491 and stationary contact 2 of relay C is connected to contact 4 of relay C by conductor 492. Stationary contact 3 of relay C is connected to one side of the winding of relay A by conductor 493 and the other side of the winding of relay A is connected to conductor 476 by conductor 494. Movable contact 5 of relay C is connected to conductor 471 by conductor 496. Movable contact 9 of relay C is connected to conductor 475 by conductor 497 and stationary contact 10 of relay C is connected to off-normal contact 1 of switch C4 by conductor 498. Movable contact 11 of relay C is connected to conductor 497 by conductor 499 and stationary contact 12 of relay C is connected to off-normal contact 1 of switch S7 by conductor 501.

Movable contact 1 of relay B is connected to terminal 52 of bank 2 of switch S3 by conductor 502. Stationary contact 2 of relay B is connected to one side of resistance R4 and the other side of resistance R4 is connected to one side of the winding of relay B by conductor 503. The other side of the winding of relay B is connected to conductor 494.

Stationary contact 3 of relay B is connected to stationary contact 1 of impulse switch S5 by conductor 504 and movable contact 4 of relay B is connected to one side of step coil D by conductor 506 and the other side of step coil D is connected to conductor 494 by conductor 507. Stationary contact 5 of relay B is connected to stationary contact 1 of the normally closed contacts 1 and 2 of step coil D by conductor 508. Stationary contact 6 of relay B is connected to one side of rectifier 44 by conductor 509 and movable contact 7 of relay B is connected to conductor 504 by conductor 511.

Stationary contact 1 of relay A is connected to movable contact 2 of step coil D by conductor 512 and movable contact 2 of relay A is connected to terminal 51 of bank 1 of switch S3 by conductor 513. Stationary contact 4 is connected to terminal 21 of bank 1 of switch S3 by conductor 514 and movable contact 5 of relay A is connected to conductor 512 by conductor 516. Movable contact 6 of relay A is connected to conductor 502 by conductor 517 and stationary contact 7 of relay A is connected to conductor 471 by conductor 518. Movable contact 8 of relay A is connected to one side of the motor 41 by conductor 519 and the other side of the motor is connected to terminal T8 by conductor 478.

Movable contact 2 of impulse switch S5 is connected to conductor 502 by conductor 521 and movable contact 3 of impulse switch S5 is connected to conductor 503 by conductor 522. Stationary contact 4 of impulse switch S5 is connected to the wiping contact of bank 2 of switch S3 by conductor 523.

As previously explained, one side of the winding of relay C is connected to terminal T6 by conductor 476. The other side of the winding of relay C is connected to conductor 491 by conductor 526 and conductor 526 is connected to terminal 11 of bank 2 of switch S9 by conductor 527. Conductor 481 is connected to the wiping contact of bank 3 of switch S9 by conductor 528.

Off-normal contact 2 of switch S7 is connected to stationary contact 1 of step coil G by conductor 531 and movable contact 2 of step coil G is connected to conductor 479 by conductor 532. Conductor 532 is connected to one end of resistance R6 by conductor 533 and the other end of resistance R6 is connected to one side of condenser C2 and the other side of condenser C2 is connected to conductor 475 by conductor 535.

Off-normal contact 2 of switch S4 is connected to stationary contact 1 of step coil E by conductor 534 and movable contact 2 of step coil E is connected to conductor 485 by conductor 536. Conductor 536 is connected to one end of resistor R7 by conductor 537 and the other end of resistance R7 is connected to one side of condenser C3 and the other side of condenser C3 is connected to conductor 475 by conductor 540.

The wiping contact of switch S7 is connected to one side of the winding of relay H by conductor 538 and the other side of the winding is connected to one end of resistor R5 by conductor 539. The other end of resistor R5 is connected to one side of the winding of relay F by conductor 541 and the other side of the winding of relay F is connected to conductor 483 by conductor 542. Conductor 539 is connected to one side of the condenser C4 by conductor 543 and the other side of the condenser C4 is connected to one end of resistor R8 and the other end of resistor R8 is connected to conductor 506 by conductor 544.

Movable contact 1 of relay H is connected to the wiping contact of switch S4 by conductor 546 and stationary contact 2 of relay H is connected to terminal 11 of bank 1 of switch S9 by conductor 547. Conductor 547 is connected to one side of reset button 46 by conductor 548 and the other side of reset button 46 is connected to conductor 483 by conductor 549. Conductor 541 is connected to conductor 547 by conductor 551.

Movable contact 5 of relay F is connected to conductor 507 by conductor 552. Movable contact 3 of relay F is connected to conductor 552 by conductor 553 and movable contact 1 of relay F is connected to conductor 552 by conductor 554. Stationary contact 2 of relay F is connected to one side of lamp 45 by conductor 556 and the other side of the lamp 45 is connected to conductor 475 as hereinbefore described. The wiping contact of bank 2 of switch S9 is connected to conductor 471 by conductor 557.

Conductor 475 is connected to the wiping contact of bank 1 of switch S3 by conductor 558. Terminals 1 through 20 and 22 through 50 of bank 1 of switch S3 are interconnected and are connected to conductor 512 by conductor 559.

Terminals 1 through 10 of bank 2 of switch S3 are connected to terminals 1 through 10 of bank 1 of switch S9 by conductors 561 through 570. Terminals 11 through 20 of bank 2 of switch S3 are interconnected and are connected to terminals 42 through 51 of bank 2 of switch S3, which are also interconnected, by conductor 571. Interconnected terminals 42 through 51 of bank 2 of switch S3 are also connected to conductor 507 by conductor 572. Terminal 21 of bank 2 of switch S3 is connected to conductor 502 by conductor 573. Terminals 22 through 41 of bank 2 of switch S3 are connected to terminals 1 through 20 of bank 1 of switch S10 by conductor 575 through 594.

Terminals 1 through 20 of switch S4 are connected to conductors 575 through 594 by conductors 595 through 614. Terminals 1 to 10 of switch S7 are connected to conductors 561 through 570 by conductors 615 through 624.

The wiping contact of bank 1 of switch S9 is connected to the wiping contact of bank 1 of switch S10 by conductor 626. Conductor 626 is connected to conductor 552 by conductor 627.

Terminals 1 through 10 of bank 3 of switch S9 are interconnected and are connected to conductor 21 which leads to remote selection apparatus 11. Terminal 11 of bank 3 of switch S9 is connected to the wiping contact of bank 2 of switch S10 by conductor 628. Terminals 1 through 20 of bank 2 of switch S10 are directly connected to local transmitters 12 by conductors 631 through 650.

The operation of the selecting and receiving apparatus as shown in Figure 7 may now be described in conjunction with the operation of the routing apparatus as shown in Figure 6. The operation of substantial portions of this apparatus is very similar to that described for Figures 4 and 5 and hence will not be described in detail.

Assuming that conductor 21 has been connected to remote selecting apparatuses 11 that have been cascaded as disclosed in my co-pending application, Serial No. 506,513 filed May 6, 1955, now Patent No. 2,877,444 and that switches S9 and S10 have been rotated to the position shown, the operation to send two steps of selecting pulses is as follows: Upon pressing start button 27, switch S3 is stepped until the wiping contact of bank 2 of switch S3 finds ground on bank 1 of switch S9, one pulse being sent out over line 21 by impulse switch S5 for each step of switch S3. This operation is very similar to that described for Figure 4 and hence will not be described.

As soon as the wiping contact of bank 2 of switch S3 has found ground, the coil of relay B is shunted to de-energize the same to terminate the first series of pulses on line 21. As described in Figure 4, as soon as relay B is de-energized, contacts 3 and 4 of relay B are closed causing switch S3 to step rapidly. It will do this until it reaches terminal 21 whereupon the negative voltage is removed from step coil D. This is because terminal 21 of bank 1 of switch S3 is connected to stationary contacts 4 and 5 which are open because relay A is energized at this time.

Stepping of switch S3 to terminal 21 places the apparatus in a condition similar to that when the wiping contact of switch S3 was on terminal 52 whereupon the wiping contact of switch S3 is again advanced under the control of impulse switch S5 until the wiping contact of bank 2 of switch S3 finds ground on bank 1 of switch S10. Relay B is operated as hereinbefore described to send the second series of pulses over line 21, one pulse being sent for each step of switch S3.

As soon as the wiping contact of bank 2 of switch S3 has found ground on bank 1 of switch S10, the coil of relay B will be shunted to cause the same to release to terminate the second series of pulses on line 21.

Release of relay B causes switch S3 to step rapidly until it reaches position 51 whereupon relay C is operated and a start pulse is sent to the transmitter 12 as hereinbefore described for Figure 4.

The selected transmitter 12 sends two sets of confirming code pulses. These pulses cause operation of relay L and the first series of pulses serve to step switch S7 one position for each pulse received. This circuit is completed from the negative terminal of the D.C. power supply 26, through conductor 205, conductor 226, contacts 1 and 2 of relay L, conductor 227, the wiping contact of bank 1 of switch S1, terminal 2 of bank 1 of switch S1, conductor 209, terminal T9, conductor 479, step coil G, conductor 482, terminal T12, conductor 212, contacts 1 and 2 of time delay device TD–1, conductor 269, conductor 271, conductor 215, conductor 206 to the positive terminal of the power supply 26.

If the number of confirming code pulses received by switch S7 conform to the number of selecting pulses transmitted over line 21, then the wiping contact of switch S7 will rest on the ground provided on bank 1 of switch S9. The ground on the wiping contact of switch S7 causes operation of relay H. This circuit can be traced from terminal T6 through conductor 476, conductor 494, conductor 507, conductor 552, conductor 627, wiping contact of bank 1 of switch S9, terminal 1 of bank 1 of switch S9, conductor 561, conductor 615, terminal 1 of switch S7, the wiping contact of switch S7, conductor 538, coil of relay H, conductor 539, conductor 543, conductor 475, terminal T5 to the negative terminal of the D.C. power supply as hereinbefore described.

Operation of relay H sets up a circuit for subsequent shunting of the coil of relay F when switch S4 receives the second series of confirming code pulses.

It should be pointed out that if the number of the first series of confirming code pulses does not correspond to the number of first series of selecting pulses, relay H will not be energized and therefore its contacts 1 and 2 will remain open which will prevent the shunt circuit for the winding of relay F from being established. When time delay device TD–1 operates and closes its contacts 2 and 3, relay F will be operated to cause the warning light 45 to be lit and to cause relay K to release to prevent the receipt of further information. The circuit for energizing relay F in this circumstance is completed from the negative power supply 26 to conductor 205, terminal T5, conductor 475, conductor 543, resistance R5, conductor 541, the winding of relay F, conductor 542, conductor 483, terminal T13, conductor 213, the wiping contact of bank 3 of switch S1, terminals 2 or 3 of bank 3 of switch S1, conductor 292 or 293, conductor 287, contacts 2 and 3 of time delay device of TD–1, conductor 269, conductor 271, conductor 215, conductor 206 to the positive terminal of the D.C. power supply.

The second series of confirming code pulses is received on terminal 3 of bank 1 of switch S1 and passes through terminal T15 to operate step coil E in a manner similar to step coil G. Switch S4 will be stepped a number of positions equal to the number of confirming code pulses received in the second series of pulses. If the number of pulses received by switch S4 corresponds to the number of the second series of selecting pulses, the wiping contact of switch S4 will be grounded on the corresponding terminal of bank 1 of switch S10.

If the wiping contact of switch S7 is resting on ground, relay F will not be operated when the wiping contact of switch S4 comes to rest on ground because the winding of relay F is shunted. This circuit is completed from one side of the winding of relay F through conductor 541, conductor 551, conductor 547, contacts 1 and 2 of relay H, conductor 546, the wiping contact of switch S4, terminal 1 of switch S4, conductor 595, conductor 575, terminal 1 of bank 1 of switch S10, wiping contact of switch S10, conductor 626, conductor 627, conductor 552, conductor 507, conductor 494, conductor 476, terminal T6 to ground.

As also pointed out previously, if relay F has not been shunted by the operation of relay H and switch S4, it will be operated when switch S1 steps to terminal 4. This circuit for energizing relay F is completed from the negative terminal of the power supply 26, through conductor 206, terminal T5, conductor 475, conductor 543, resistance R5, conductor 541, the winding of relay F, conductor 542, conductor 483, terminal T13, conductor 213, wiping contact of bank 3 of switch S1, terminal 4 of bank 3 of switch S1, conductor 294, conductor 261, conductor 269, conductor 271, conductor 215, conductor 206 to the positive terminal of the D.C. power supply 26.

Thus, it is apparent that relay F will be operated unless the number of confirming code pulses in both series of pulses is equal to the number of pulses in both series of selecting pulses.

After the reception of both series of confirming code pulses, the operation for reception of feet and inch pulses is identical to that described for Figure 4, except that the feet pulses will be received on terminal 4 of bank 1 of switch S1 and the inch pulses will be received on terminal 5 of bank 1 of switch S1.

Contacts 11 and 12 of relay C function in a manner similar to the contacts 9 and 10 of relay C and serve to reset step switch S7.

As previously described, the apparatus in Figures 6 and 7 can be connected to remote selecting apparatuses 11 which have been cascaded so that any number of tanks can be read. The first series of selecting pulses may merely serve to select the desired remote selecting apparatus 11 and then the second series of pulses selects the desired transmitter 12.

In utilizing the apparatus shown in Figures 6 and 7 for taking a reading at the local transmitter 12, switch S9 is moved to terminal 11. Terminal 11 of switch S9 provides a ground to continuously shunt relay D to disable the confirming means.

The desired local transmitter is then selected by rotating switch S10 to the proper terminal.

Terminal 11 of bank 2 of switch S9 provides negative voltage for operating relay C and disables the portion of the apparatus sending selective pulses as described in connection with Figure 5.

Terminal 11 of bank 3 of switch S9 moves line 21 from terminal T11 and places terminal T11 on the wiping contact on bank 2 of switch S10.

The apparatus then sends a start pulse to the selected transmitter 12 through bank 2 of switch S10 to cause the transmitter 12 to send the desired information after which the operation is similar to that described for Figure 5.

Figure 8:
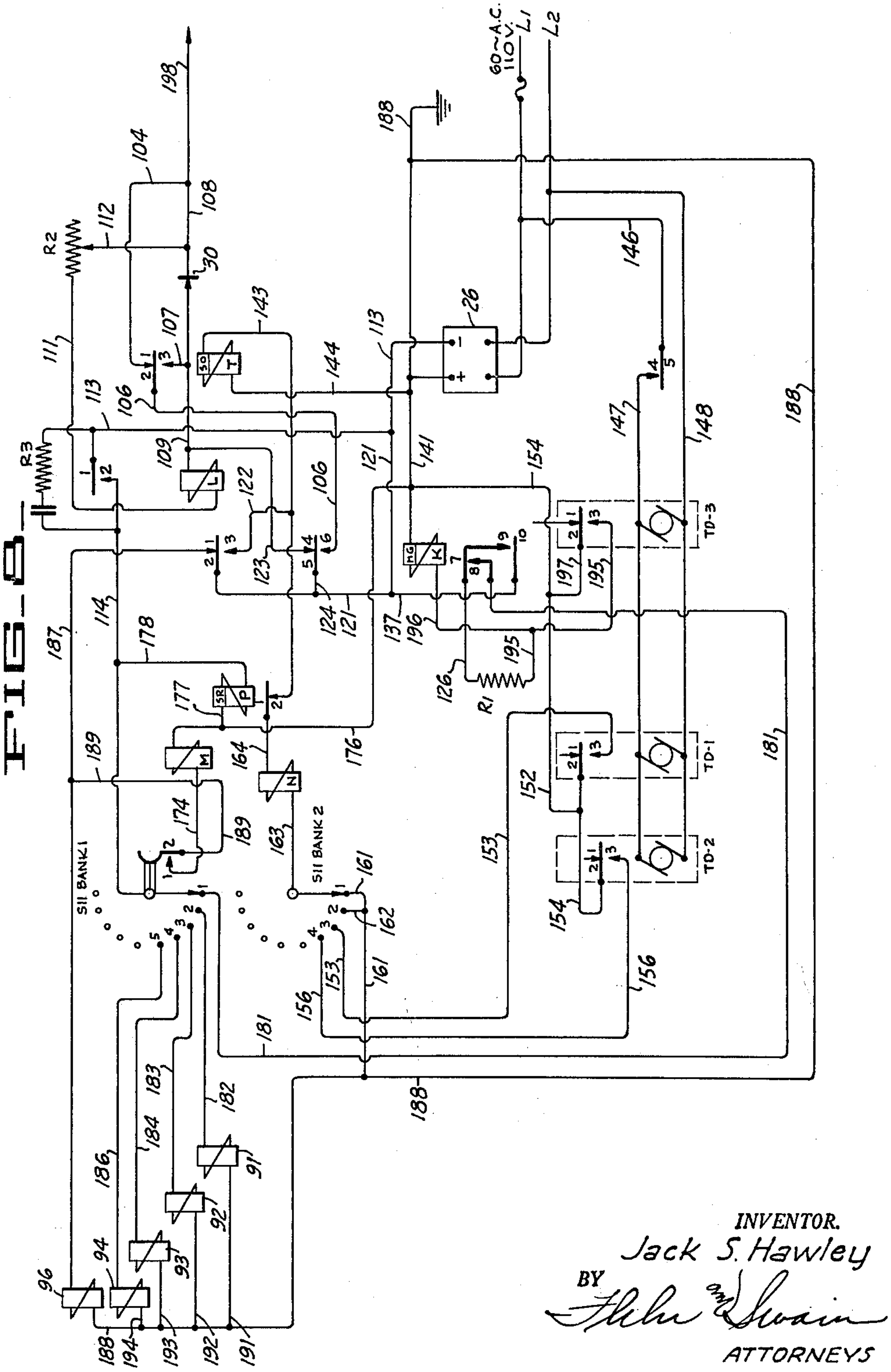
Figure 8 is a circuit diagram of another embodiment of my invention illustrating a routing system and apparatus adapted to be used with automatic printing devices.

In Figure 8, I have shown another embodiment of the routing apparatus shown in Figure 2. The routing apparatus in Figure 8 has been modified for connection to automatic printers of the type manufactured by Streeter-Amet Corporation and which are provided with a plurality of printing register coils 91, 92 and 93, a printing coil 94 and a reset coil 96.

The routing apparatus shown in Figure 8 is very similar to that shown in Figure 2 except that a selecting means is not used. The apparatus of Figure 8 embodies the following changes. An additional time delay device TD–3 has been provided and is substituted for the reset button 28.

Terminal 1 of bank 1 of switch S1 is connected to stationary contact 8 of relay K by conductor 181. Terminals 2, 3 and 4 of bank 1 of switch S11 are connected to printing register coils 91, 92 and 93 by conductors 182, 183 and 184 respectively. Terminal 5 of bank 1 is connected to printing coil 94 by conductor 186.

Stationary contact 1 of relay K is connected to one side of the reset coil 96 by conductor 187 and the other side of the reset coil 96 is connected to ground through conductor 188. Conductor 187 is connected to off-normal contact 2 of switch S11 by conductor 189. The other side of the coils 91, 92 and 93 and 94 are connected to conductor 188 by conductors 191, 192, 193 and 194.

Stationary contact 3 of TD–3 is connected to one end of resistor R1 by conductor 195 and conductor 195 is connected to one side of relay K by conductor 196. Movable contact 2 of TD–3 is connected to conductor 154 by conductor 197. Conductors 147 and 148 are also connected to the motor of TD–3 as in TD–1 and TD–2.

Conductor 104 is connected to one or more transmitters 12 by any suitable means such as by wire or radio, but in this instance has been shown to be connected to the transmitters 12 by line 198. It is possible to connect line 198 to one or more transmitters 12 if each of the transmitters are provided with suitable clockwork which will cause the transmitter to be connected to the line 198 for a predetermined period of time. The predetermined interval of time must be longer than the time required for the transmitter to transmit the required information to the routing apparatus of Figure 9 and must be shorter than the time for which the time delay device TD–3 is set. For example, the transmitter could be connected to the line 198 for approximately a period of thirty seconds and time delay device TD–3 could be set for a period of approximately thirty-five seconds.

The operation of the routing apparatus as shown in Figure 8 may now be briefly described as follows: It is to be noted that a negative D.C. potential is continuously applied to one side of the winding of relay L. The negative terminal of the D.C. power supply 26 is connected to one side of the L relay through conductor 113, conductor 121, conductor 124, contacts 4 and 5 of relay K, and conductor 123.

Relay L normally will not be operated when the apparatus in Figure 8 is in the "home" position because normally no transmitters are connected to line 198. However, as soon as a transmitter is connected to line 198 by suitable means such as clockwork, a ground will be placed on the line and relay L will be operated. This circuit is completed from a negative of the D.C. power supply 26 through conductor 113, conductor 121, conductor 124, contacts 4 and 5 of relay K, conductor 123, the winding of relay L, conductor 111, adjustable tap 1 of resistance R2, conductor 112, conductor 108, line 198 to ground at the transmitter 12.

Operation of relay L closes its contacts 1 and 2 and places a pulse on terminal 1 of bank 1 of switch S1 to operate relay K. This circuit is completed from the negative terminal of the D.C. power supply 26 through conductor 113, contacts 1 and 2 of relay L, conductor 114, the wiping contact of bank 1 of switch S11, terminal 1 of bank 1, conductor 181, contacts 7 and 8 of relay K, conductor 126, resistance R1, conductor 195, conductor 196, the winding of relay K, conductor 141 to the positive terminal of the D.C. power supply.

The operation of the apparatus of Figure 8 then continues in a manner similar to that of Figure 2 just as if the start button 27 had been operated. A start pulse is sent out on line 198 to start the operation of the transmitter 12 after which the transmitter sends predetermined information to operate the register coils 91, 92 and 93. For example, confirming code pulses could be received on register coil 91, foot pulses could be received on register coil 92 and inch pulses could be received on register coil 93.

After transmission of the predetermined information, the transmitter 12 will ground line 198 to cause a pulse to be sent over terminal 5 of bank 1 to operate printing coil 94. The transmitter is then disconnected from line 198 by the clockwork. After this disconnection has been completed, time delay device TD–3 will operate closing contacts 2 and 3 of TD–3 to establish a shunt circuit for releasing relay K in a manner similar to the way in which relay K is de-energized when the reset button 28 is operated. Thus, the apparatus is restored to "home" position where it is ready to be connected to another transmitter 12 by suitable clockwork.

It will be evident from the foregoing that the selecting and receiving and routing system and apparatus I have disclosed herein contain many desirable features which are adapted for use in a wide variety of telemetering systems. In addition, I have provided a system and apparatus which can be set up in many different combinations to handle a wide variety of situations. For example, the apparatus can be directly connected to a plurality of transmitters where the transmitters are located relatively close to the reading station to thus provide direct local selection. The apparatus can be used to send a single series of selecting pulses to remotely located transmitters and also to provide local selection. The apparatus can also be used to send two or more series of pulses to remotely located transmitters and also to provide local selection.

Thus, it is apparent that applicant's system and apparatus can be used for many different combinations of local and remotely located transmitters while at the same time using many common components to greatly decrease the cost of an installation.

Applicant has provided simple and economical confirming means for determining whether the proper transmitter has been selected.

Applicant has also provided means whereby information may be recorded automatically from a number of remotely located transmitters merely by use of simple clockwork means for connecting the transmitters to applicant's apparatus at spaced predetermined intervals.

Applicant has described his apparatus in conjunction with the measuring of liquid level in tanks, but it is apparent that applicant's device can be utilized in metering many different types of information. Additional information may be metered merely by adding additional components so that one or more additional series of pulses may be utilized for obtaining the information.

I claim:

1. In a telemetering system of the character described adapted to indicate information at a reading station received from a transmitting station in the form of one or more series of indicating pulses, means at the reading station for sending a start pulse to the transmitting station to initiate operation of the same, indicating means at the reading station for each series of indicating pulses, each indicating means being adapted to be moved step by step to indicating position, routing means at the reading station for receiving one or more series of indicating pulses from the transmitting station and routing each series of pulses to said indicating means, said routing means being adapted to be advanced step by step and including means at the reading station for advancing the same step by step from one indicating means to the next indicating means upon termination of each series of indicating pulses, said routing means also including timing means at the reading station for advancing the routing means to the next step if no pulses are received during the time interval in which a particular series of indicating pulses should have been received, and means for resetting said system upon completion of the reading operation.

2. A telemetering system as in claim 1 together with means for connecting a plurality of transmitting stations to said reading station, said last named means including timing means at the transmitting station for connecting each of said transmitting stations to said reading station at spaced time intervals.

3. A telemetering system as in claim 1 together with means for connecting a plurality of transmitting stations to said reading station, and means at the reading station for selecting said transmitting stations individually.

4. In a telemetering system of the character described adapted to indicate information at a reading station received from a transmitting station in the form of one or more series of electrical pulses, means at the reading station for sending a start pulse to the transmitting station to initiate operation of the same, indicating means at the reading station adapted to be advanced step by step, a step switch having a plurality of terminals together with a wiping contact for engaging the terminals, a step coil for advancing the step switch, means for connecting predetermined terminals of said switch to said indicating means, circuit means for connecting the wiping contact of the step switch to the transmitting station, relay means at the reading station connected to said circuit means, said relay means being energized upon receipt of the first pulse in a series of pulses from the transmitting station and releasing after the last pulse of a series of pulses to cause energization of said step coil to advance said step switch to the next terminal, timing means at the reading station for advancing said switch to the next terminal when no pulses are received during the time interval when a particular series of pulses should have been received, and means for resetting said system upon completion of the reading operation.

5. In a telemetering system of the character described adapted to indicate information at a reading station received from a plurality of transmitters directly connected to the reading station or from a plurality of transmitters connected to the reading station through remote selecting means, said transmitters being of the type adapted to transmit one or more series of confirming code pulses and one or more series of indicating pulses; selecting means at the reading station for sending one or more series of selecting pulses, said pulses being adapted to actuate the remote selecting means to cause a transmitter to be selected and electrically connected to the reading station, means at the reading station for sending a start pulse to the selected transmitter to actuate the same, confirming means at the reading station for receiving one or more series of confirming code pulses from the selected transmitter, warning means at the reading station, means at the reading station for actuating said warning means when the number of confirming code pulses received does not correspond to the number of selecting code pulses previously sent to the remote selecting means and when no confirming code pulses are received, indicating means at the reading station adapted to be moved step by step to an indicating position, routing means at the reading station adapted to be moved step by step for receiving the indicating pulses from the selected transmitter and routing the indicating pulses to said indicating means, said routing means including means for advancing the same to the next step upon termination of each series of indicating pulses, timing means at the reading station connected to said routing means for advancing the routing means to the next step when no pulses are received during a time interval when a particular series of indicating pulses should have been received, and means for resetting the system upon completion of the reading operation.

6. A telemetering apparatus as in claim 5 together with direct selecting means for selecting one of the transmitters directly connected to the reading station, said last named means including means for preventing the operation of said selecting means and said confirming means when said direct selecting means is operated.

7. Telemetering apparatus as in claim 5 wherein said selecting pulses are motor controlled.

8. Telemetering apparatus as in claim 5 wherein no indicating pulses are received if the improper transmitter has been selected.

9. In a telemetering system of the character described adapted to indicate information at a reading station received from a plurality of transmitters directly connected to the reading station or from a plurality of transmitters connected to the reading station through remote selecting means, said transmitters being of the type adapted to transmit one or more series of confirming code pulses and one or more series of indicating pulses; selecting means at the reading station for sending one or more series of selecting pulses, said pulses being adapted to actuate the remote selecting means to cause a transmitter to be selected and electrically connected to the reading station, means at the reading station for sending a start pulse to the selected transmitter to actuate the same, confirming means at the reading station for receiving one or more series of confirming code pulses from the selected transmitter, said confirming means including means for comparing the confirming pulses received from the selected transmitter with the selecting pulses, indicating means at the reading station adapted to be moved step by step to an indicating position, routing means at the reading station adapted to be moved step by step for receiving the indicating pulses from the selected transmitter and routing the indicating pulses to said indicating means, said routing means including means for advancing the same to the next step upon termination of each series of indicating pulses, timing means at the reading station connected to said routing means for advancing the routing means to the next step when no pulses are received during a time interval when a particular series of indicating pulses should have been received, and means for resetting the system upon completion of the reading operation.

10. Telemetering apparatus as in claim 9 wherein the resetting means includes means for resetting the system in the event of power failure.

11. Telemetering apparatus as in claim 9 together with means at the reading station for adjusting the indicating pulses received from the selected transmitter.

12. Telemetering apparatus as in claim 9 wherein said selecting means includes a step switch, and means for rapidly stepping the step switch to a "home" position after a desired number of selecting pulses have been sent.

13. In a telemetering system of the character described adapted to indicate information at a reading station received from a plurality of transmitters directly connected to the reading station or from a plurality of transmitters connected to the reading station through remote selecting means, said transmitters being of the type adapted to transmit one or more series of indicating pulses; selecting means at the reading station for sending one or more series of selecting pulses, said pulses being adapted to actuate the remote selecting means to cause a transmitter to be selected and electrically connected to the reading station, means at the reading station for sending a start puse to the selected transmitter to actuate the same, indicating means at the reading station adapted to be moved step by step to an indicating position, routing means at the reading station adapted to be moved step by step for receiving the indicating pulses from the selected transmitter and routing the indicating pulses to said indicating means, said routing means including means for advancing the same to the next step upon termination of each series of indicating pulses, timing means at the reading station connected to said routing means for advancing the routing means to the next step when no pulses are received during a time interval when a particular series of indicating pulses should have been received, and means for resetting the system upon completion of the reading operation.

References Cited in the file of this patent

UNITED STATES PATENTS

| | | |
|---|---|---|
| 2,035,358 | Yates | Mar. 24, 1936 |
| 2,444,202 | McAlpine | June 29, 1945 |
| 2,597,075 | Derr | May 20, 1952 |
| 2,717,370 | Piper | Sept. 6, 1955 |